(12) United States Patent
Ghatage et al.

(10) Patent No.: US 10,943,274 B2
(45) Date of Patent: Mar. 9, 2021

(54) AUTOMATION AND DIGITIZALIZATION OF DOCUMENT PROCESSING SYSTEMS

(71) Applicant: Accenture Global Solutions Limited, Dublin (IE)

(72) Inventors: Prakash Ghatage, Bangalore (IN); Kumar Viswanathan, San Jose, CA (US); Sebastian Fernandes, Bangalore (IN); Naveen Kumar Thangaraj, Salem, TN (US)

(73) Assignee: Accenture Global Solutions Limited, Dublin (IE)

( * ) Notice: Subject to any disclaimer, the term of this patent is extended or adjusted under 35 U.S.C. 154(b) by 102 days.

(21) Appl. No.: 16/115,215

(22) Filed: Aug. 28, 2018

(65) Prior Publication Data

US 2020/0074515 A1 Mar. 5, 2020

(51) Int. Cl.
*G06Q 30/04* (2012.01)
*G06F 21/64* (2013.01)
(Continued)

(52) U.S. Cl.
CPC ............ *G06Q 30/04* (2013.01); *G06F 16/35* (2019.01); *G06F 21/64* (2013.01); *G06F 40/40* (2020.01); *G06K 9/00449* (2013.01); *G06N 20/00* (2019.01)

(58) Field of Classification Search
CPC .......... G06F 40/58; G06F 16/35; G06F 21/64; G06F 40/40; G06Q 30/04; G06N 20/00; G06K 9/00449
See application file for complete search history.

(56) References Cited

U.S. PATENT DOCUMENTS

| 7,069,234 B1 * | 6/2006 | Cornelius | G06Q 20/10 |
| | | | 705/26.35 |
| 7,167,844 B1 * | 1/2007 | Leong | G06Q 30/04 |
| | | | 705/37 |

(Continued)

OTHER PUBLICATIONS

D. Magazzeni, P. McBurney and W. Nash, "Validation and Verification of Smart Contracts: A Research Agenda," in Computer, vol. 50, No. 9, pp. 50-57, 2017, doi: 10.1109/MC.2017.3571045. (Year: 2017).*

*Primary Examiner* — Bruce I Ebersman
*Assistant Examiner* — Steven R Chism
(74) *Attorney, Agent, or Firm* — Harrity & Harrity, LLP

(57) ABSTRACT

A device receives documents from various sources, and processes the documents, with an optical character recognition engine, to generate digitized documents. The device processes the digitized documents, with a first machine learning model, to detect languages utilized in the digitized documents, and processes the digitized documents, in other languages that are different than a common language and with a second machine learning model, to translate the digitized documents, in the other languages, into the common language and to generate translated digitized documents. The device processes the translated digitized documents and untranslated digitized documents, with a classification model, to generate classified documents, and processes the classified documents, with a third machine learning model, to generate extracted information from the classified documents. The device validates the extracted information based on business rules and to generate validated extracted information, and generates a smart contract for a transaction based on the validated extracted information.

20 Claims, 19 Drawing Sheets

(51) Int. Cl.
    *G06K 9/00*         (2006.01)
    *G06N 20/00*       (2019.01)
    *G06F 16/35*        (2019.01)
    *G06F 40/40*        (2020.01)

(56) References Cited

U.S. PATENT DOCUMENTS

| | | | |
|---|---|---|---|
| 8,620,842 B1* | 12/2013 | Cormack | G06N 20/00 |
| | | | 706/12 |
| 9,262,405 B1* | 2/2016 | Baliga | G06F 40/58 |
| 9,934,432 B2* | 4/2018 | Agrawal | G06F 40/174 |
| 2003/0233286 A1* | 12/2003 | Hahn-Carlson | G06Q 30/0283 |
| | | | 705/317 |
| 2004/0083199 A1* | 4/2004 | Govindugari | G06F 16/215 |
| 2005/0235274 A1* | 10/2005 | Mamou | G06Q 10/10 |
| | | | 717/136 |
| 2006/0059162 A1* | 3/2006 | Rizk | G06F 40/103 |
| 2011/0184863 A1* | 7/2011 | Coleman | G06Q 30/04 |
| | | | 705/40 |
| 2012/0047052 A1* | 2/2012 | Patel | G06Q 40/00 |
| | | | 705/30 |
| 2015/0379430 A1* | 12/2015 | Dirac | G06N 20/00 |
| | | | 706/12 |
| 2017/0161643 A1* | 6/2017 | Hoover | G06Q 30/0206 |
| 2017/0169103 A1* | 6/2017 | Juneja | G06F 16/93 |
| 2017/0351913 A1* | 12/2017 | Chen | G06K 9/46 |
| 2018/0218176 A1* | 8/2018 | Voorhees | H04L 9/3213 |

* cited by examiner

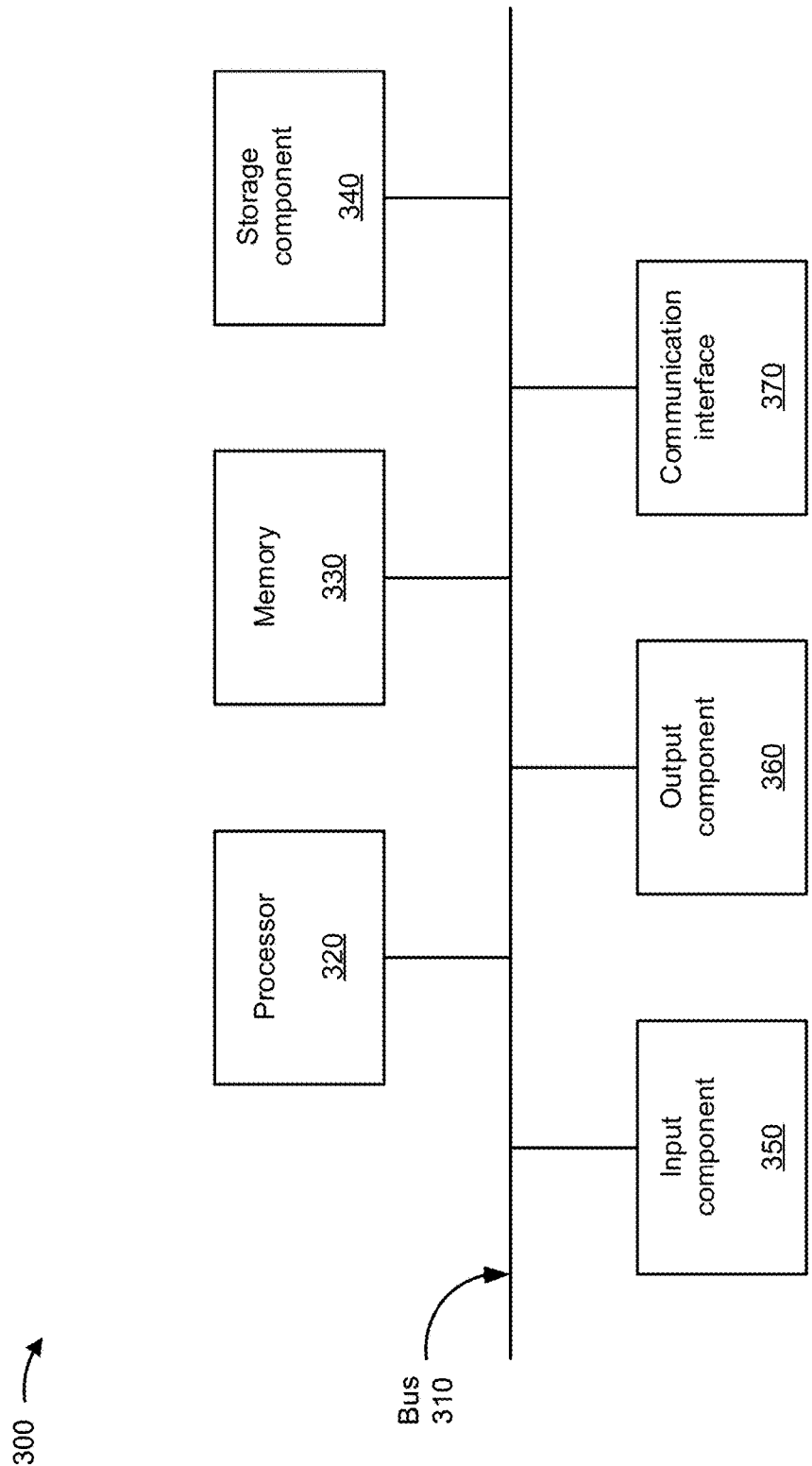

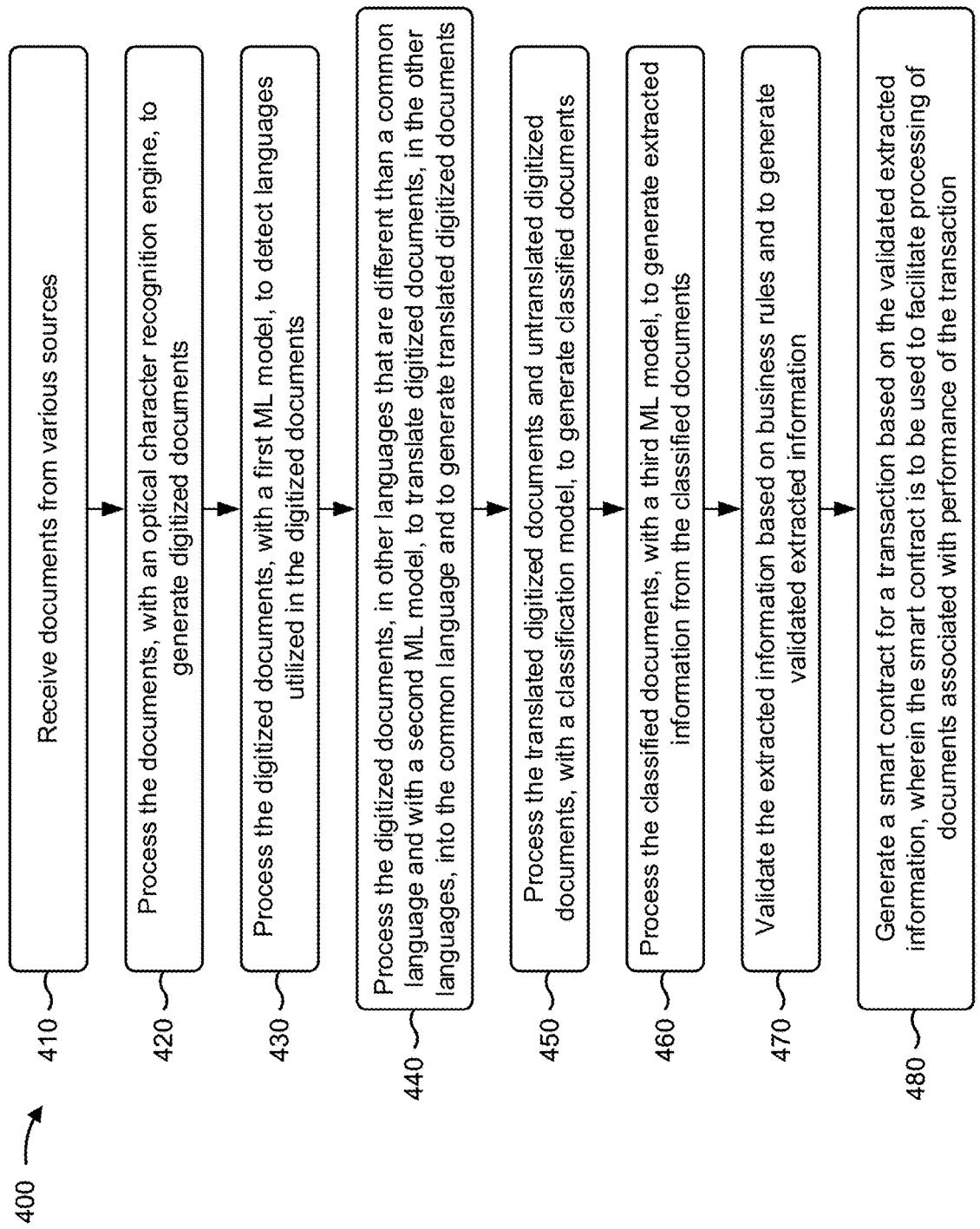

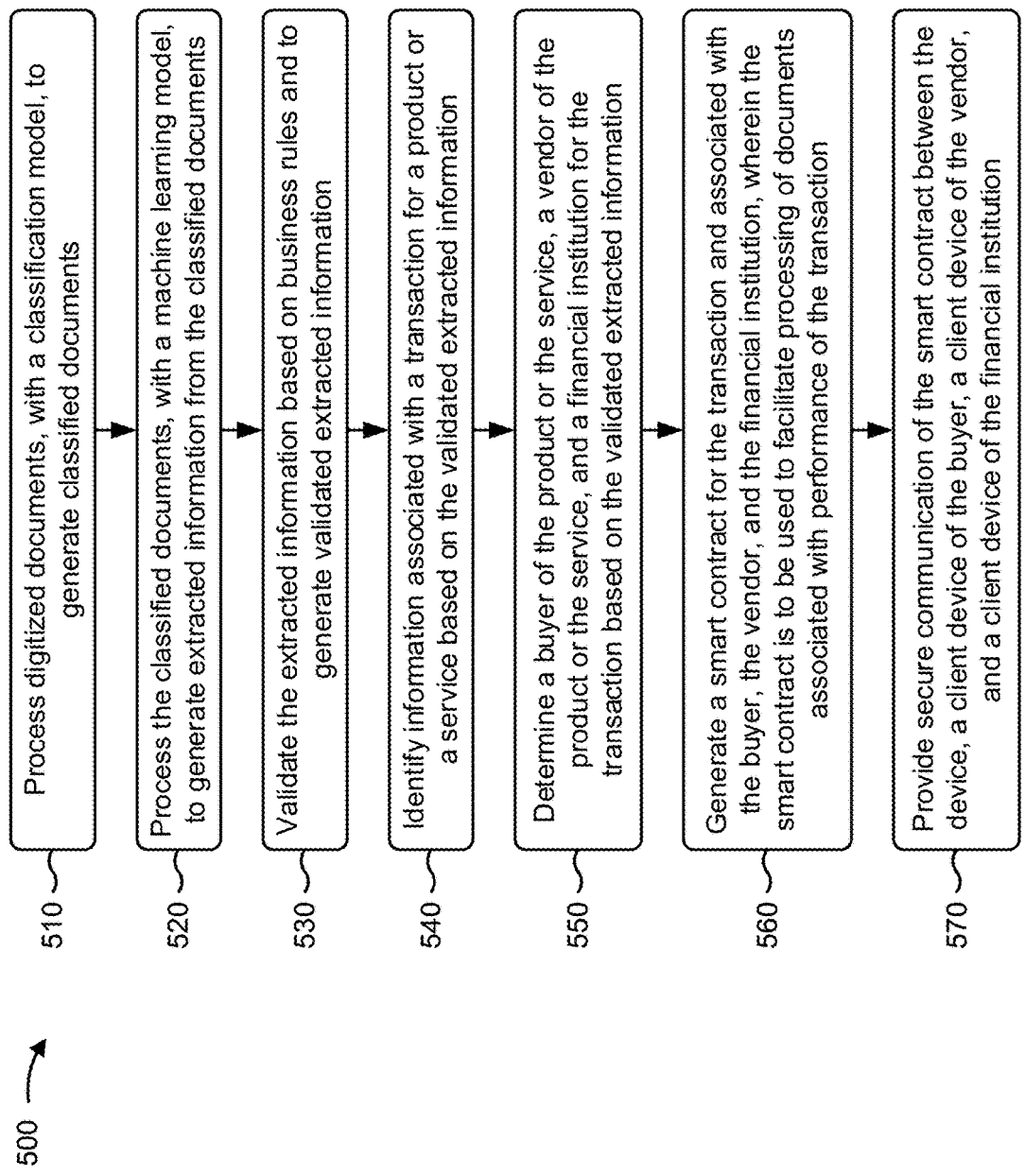

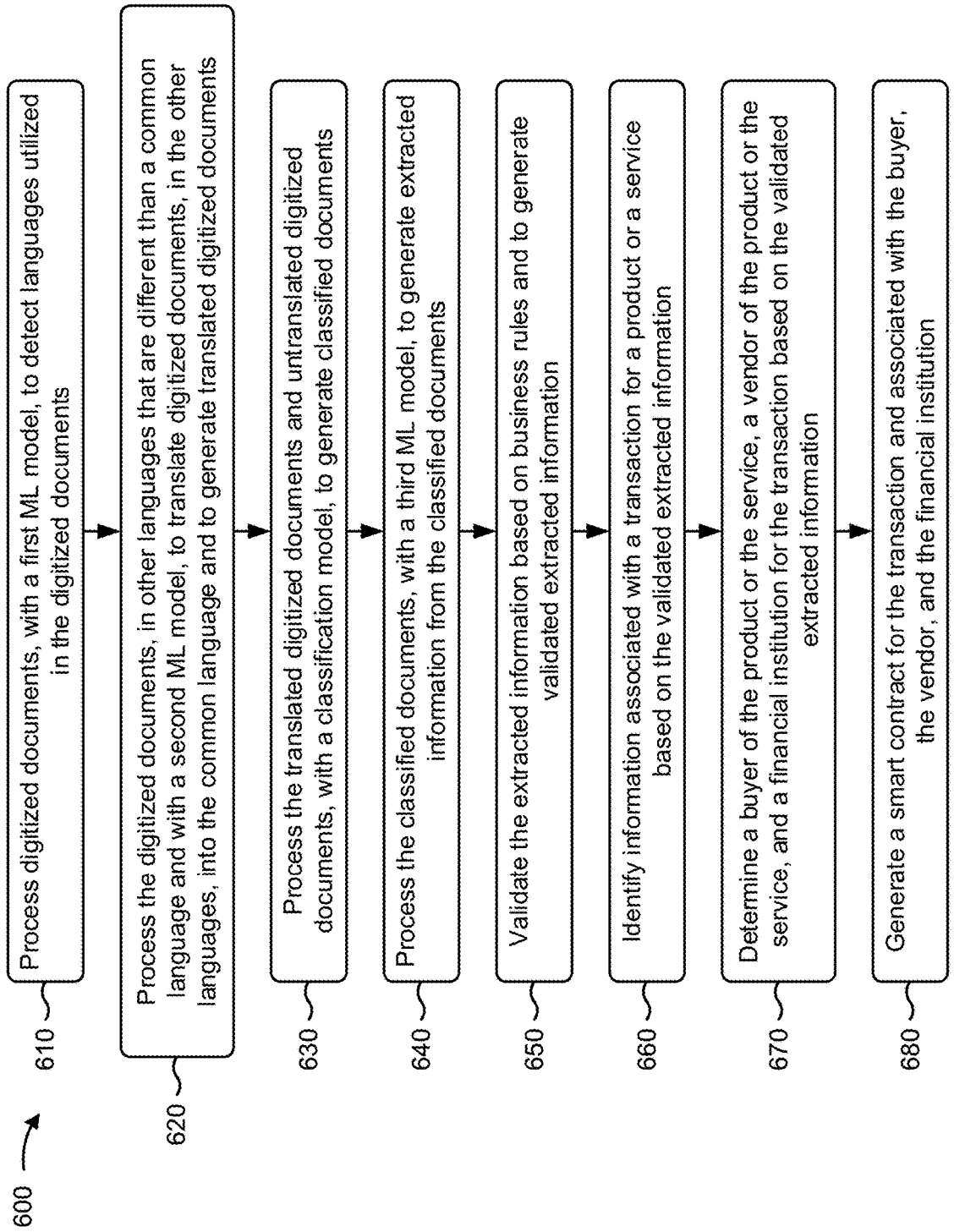

US 10,943,274 B2

AUTOMATION AND DIGITIZALIZATION OF DOCUMENT PROCESSING SYSTEMS

BACKGROUND

Current document (e.g., invoice) processing systems require manual performance of steps with different degrees of sophistication. For example, an entity provides hard copies of documents either in printed or handwritten format, and a team of people at the entity will update information in the document processing systems based on the documents. In another example, the entity provides the hard copies of the documents, and the team of people will scan the documents and perform data entry in the document processing systems. The entity may also provide images of the documents (e.g., based on scanning the hard copies of the documents) to a data center via the document processing systems. The entity may utilize an information interchange to convert the hard copies of the documents into an electronic data interchange (EDI) format. The entity may hire a service provider that collects the hard copies of the documents and provides a data repository of the documents for the entity.

SUMMARY

According to some implementations, a device may include one or more memories, and one or more processors, communicatively coupled to the one or more memories, to receive documents from various sources, and process the documents, with an optical character recognition engine, to generate digitized documents. The one or more processors may process the digitized documents, with a first machine learning model, to detect languages utilized in the digitized documents, and may process the digitized documents, in other languages that are different than a common language and with a second machine learning model, to translate the digitized documents, in the other languages, into the common language and to generate translated digitized documents. The one or more processors may process the translated digitized documents and untranslated digitized documents, with a classification model, to generate classified documents, and may process the classified documents, with a third machine learning model, to generate extracted information from the classified documents. The one or more processors may validate the extracted information based on business rules and to generate validated extracted information, and may generate a smart contract for a transaction based on the validated extracted information, wherein the smart contract may be used to facilitate processing of documents associated with performance of the transaction.

According to some implementations, a non-transitory computer-readable medium may store instructions that include one or more instructions that, when executed by one or more processors of a device, cause the one or more processors to process digitized documents, with a classification model, to generate classified documents, and process the classified documents, with a machine learning model, to generate extracted information from the classified documents. The one or more instructions may cause the one or more processors to validate the extracted information based on business rules and to generate validated extracted information, and identify information associated with a transaction for a product or a service based on the validated extracted information. The one or more instructions may cause the one or more processors to determine a buyer of the product or the service, a vendor of the product or the service, and a financial institution for the transaction based on the validated extracted information, and generate a smart contract for the transaction and associated with the buyer, the vendor, and the financial institution, wherein the smart contract may be used to facilitate processing of documents associated with performance of the transaction. The one or more instructions may cause the one or more processors to provide secure communication of the smart contract between the device, a client device of the buyer, a client device of the vendor, and a client device of the financial institution.

According to some implementations, a method may include processing digitized documents, with a first machine learning model, to detect languages utilized in the digitized documents, and processing the digitized documents, in other languages that are different than a common language and with a second machine learning model, to translate the digitized documents, in the other languages, into the common language and to generate translated digitized documents. The method may include processing the translated digitized documents and untranslated digitized documents, with a classification model, to generate classified documents, and processing the classified documents, with a third machine learning model, to generate extracted information from the classified documents. The method may include validating the extracted information based on business rules and to generate validated extracted information, and identifying information associated with a transaction for a product or a service based on the validated extracted information. The method may include determining a buyer of the product or the service, a vendor of the product or the service, and a financial institution for the transaction based on the validated extracted information, and generating a smart contract for the transaction and associated with the buyer, the vendor, and the financial institution.

BRIEF DESCRIPTION OF THE DRAWINGS

FIG. 3 is a diagram of example components of one or more devices of FIG. 2.

FIGS. 4-6 are flow charts of example processes for providing automation and digitalization of document processing systems.

DETAILED DESCRIPTION OF PREFERRED EMBODIMENTS

The following detailed description of example implementations refers to the accompanying drawings. The same reference numbers in different drawings may identify the same or similar elements.

The manual performance of the steps associated with document processing systems are labor intensive and time consuming. Furthermore, the manual performance of the steps associated with document processing systems require utilization of hard copies of documents, which is cumbersome, consumes resources (e.g., processing resources, memory resources, and/or the like associated with image recognition systems), and eliminates natural resources (e.g., trees used to make paper).

Some implementations described herein provide an electronic document platform that provides automation and digitalization of document processing systems. For example, the electronic document platform may receive documents from various sources, and may process the documents, with an optical character recognition engine, to generate digitized documents. The electronic document platform may process the digitized documents, with a first machine learning model, to detect languages utilized in the digitized documents, and may process the digitized documents, in other languages that are different than a common language and with a second machine learning model, to translate the digitized documents, in the other languages, into the common language and to generate translated digitized documents. The electronic document platform may process the translated digitized documents and untranslated digitized documents, with a classification model, to generate classified documents, and may process the classified documents, with a third machine learning model, to generate extracted information from the classified documents. The electronic document platform may validate the extracted information based on business rules and to generate validated extracted information, and may generate a smart contract for a transaction based on the validated extracted information.

In this way, the electronic document platform may provide an end-to-end solution that automates and digitalizes document processing systems, such as invoice processing systems, contract processing systems, remittance processing systems, and/or the like. The electronic document platform may reduce or eliminate data entry, increase accuracy associated with document processing systems, conserve computing resources (e.g., processing resources, memory resources, and/or the like), and reduce costs associated with document processing systems.

Figure 1A:
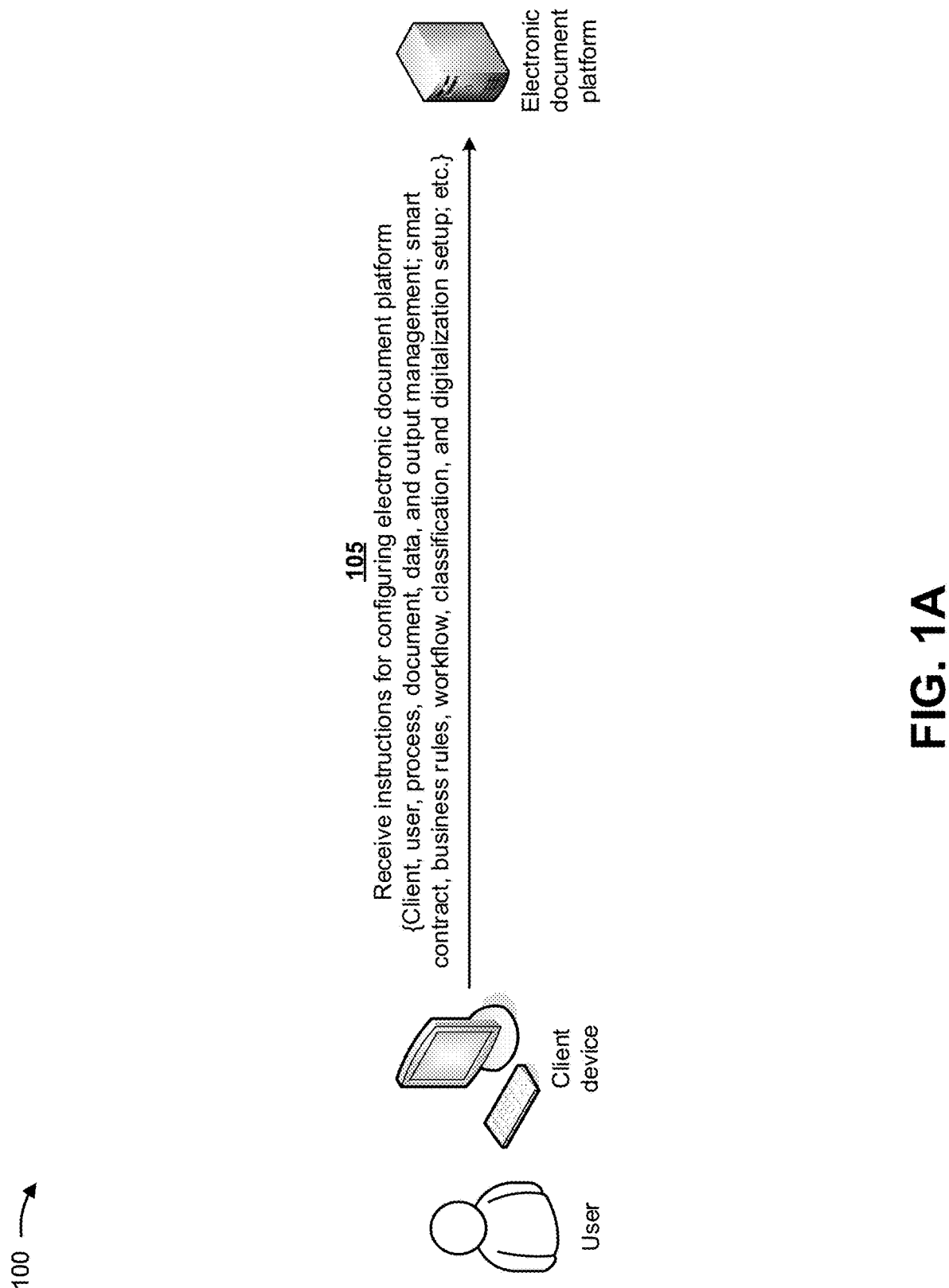
FIGS. 1A-1N are diagrams of an example implementation described herein.
Figure 1B:
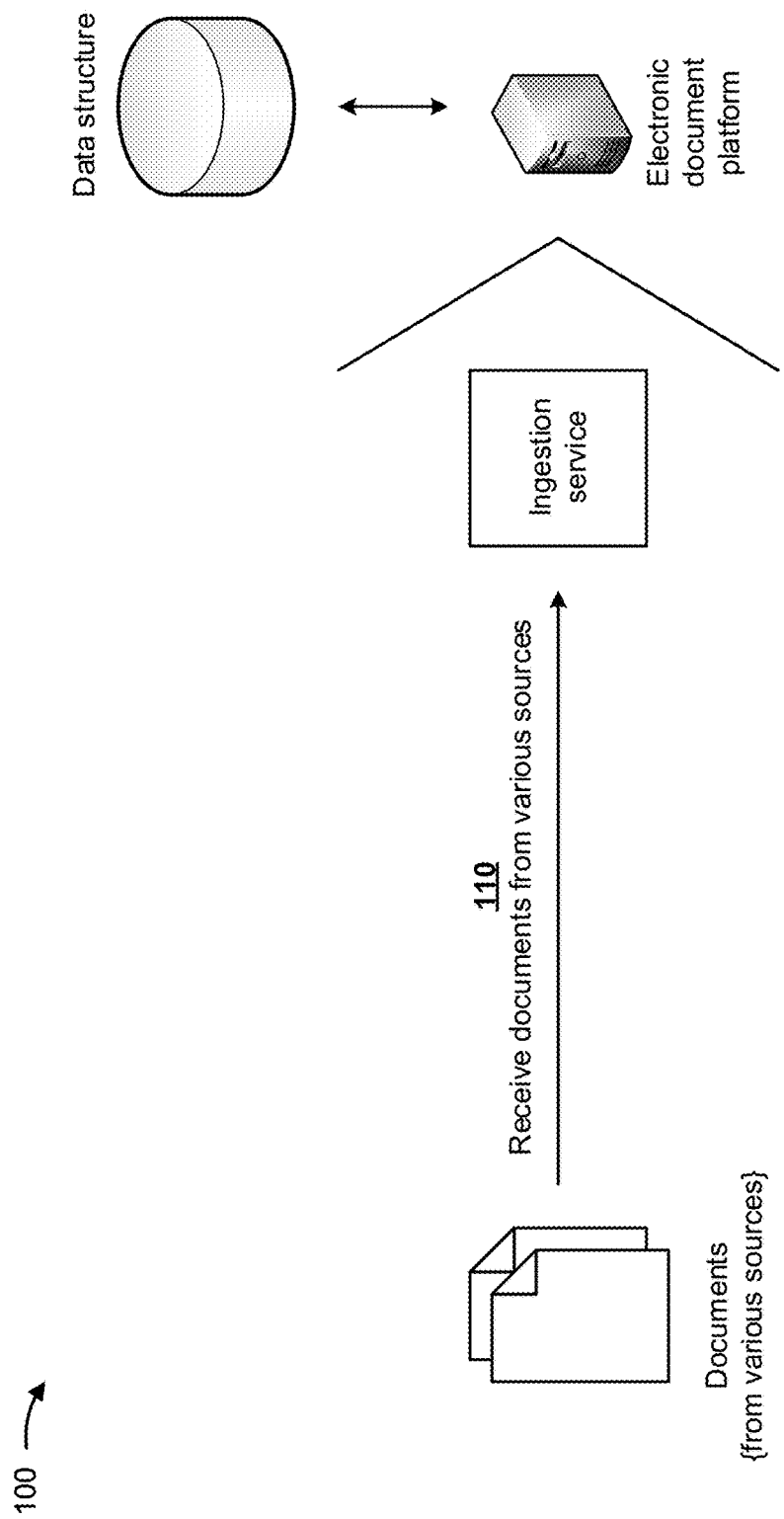
Figure 1C:
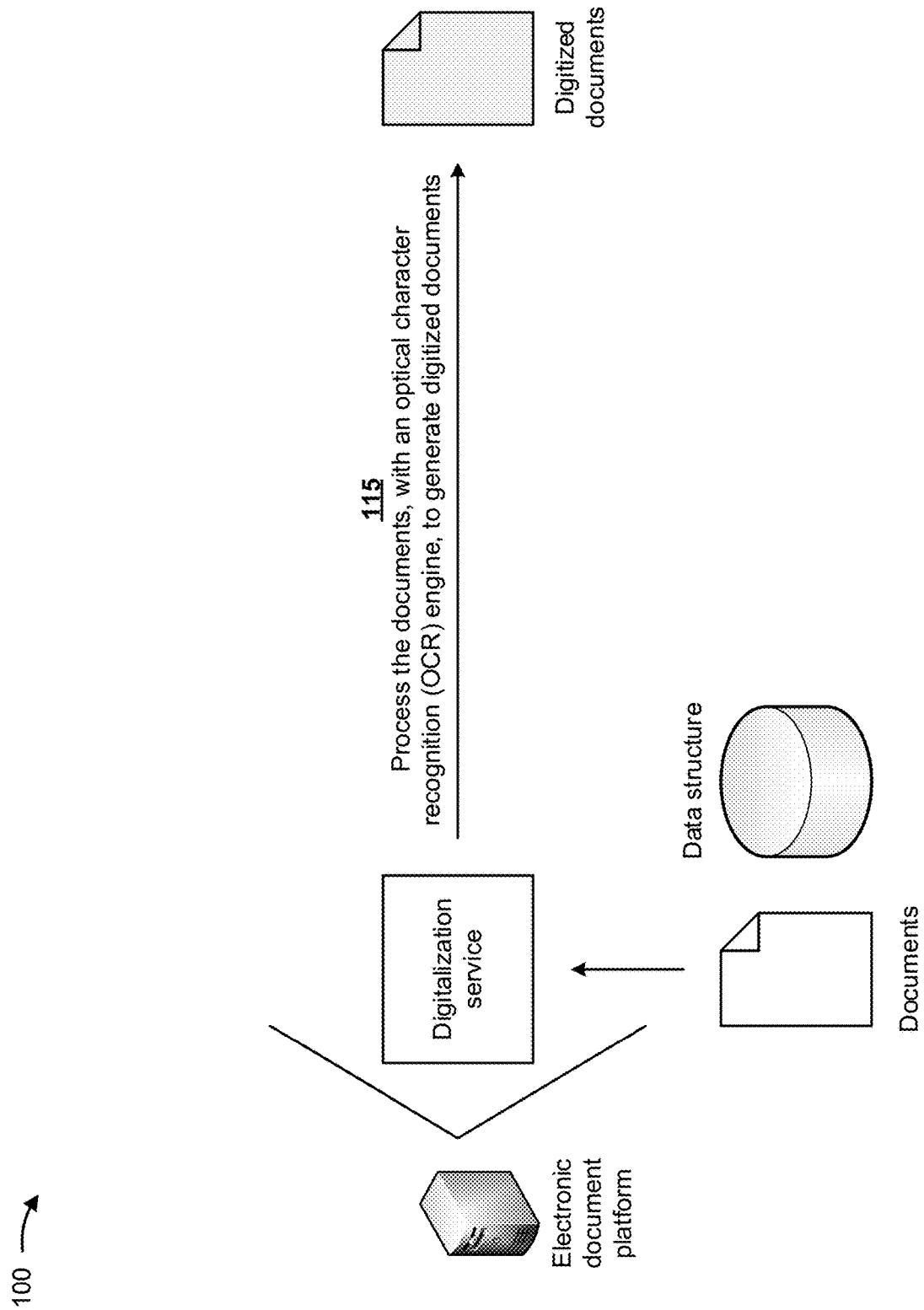
Figure 1D:
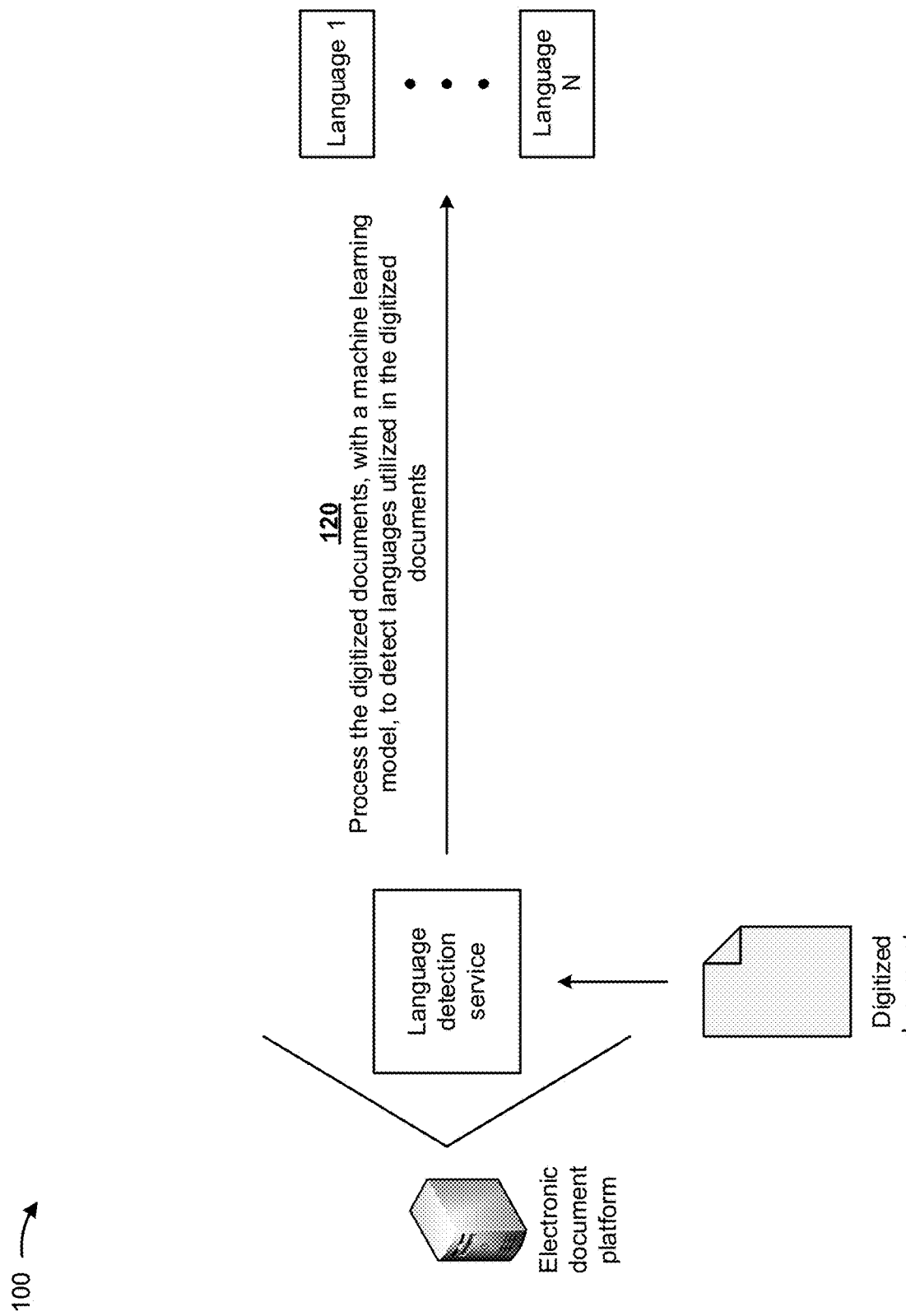
Figure 1E:
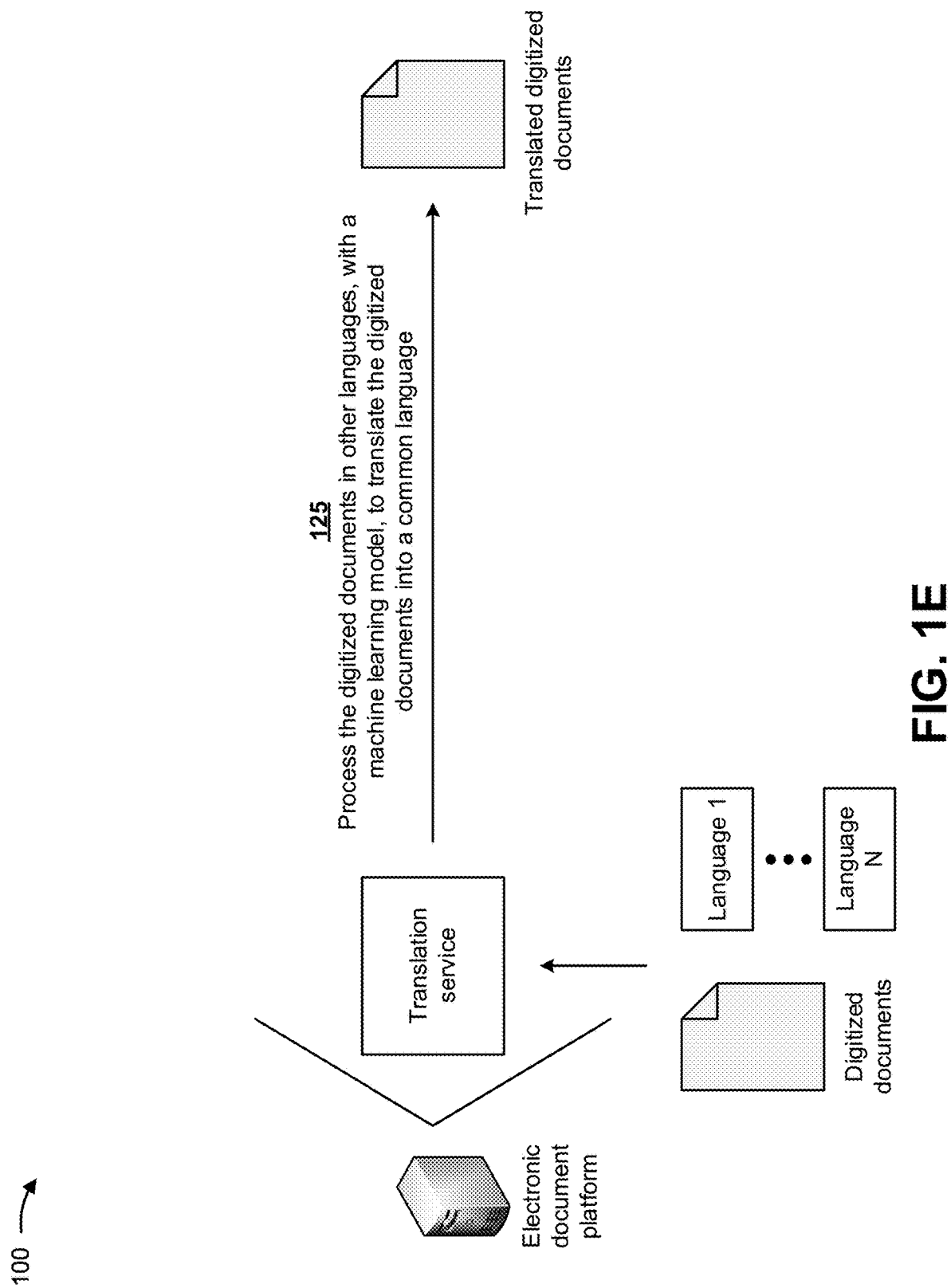
Figure 1F:
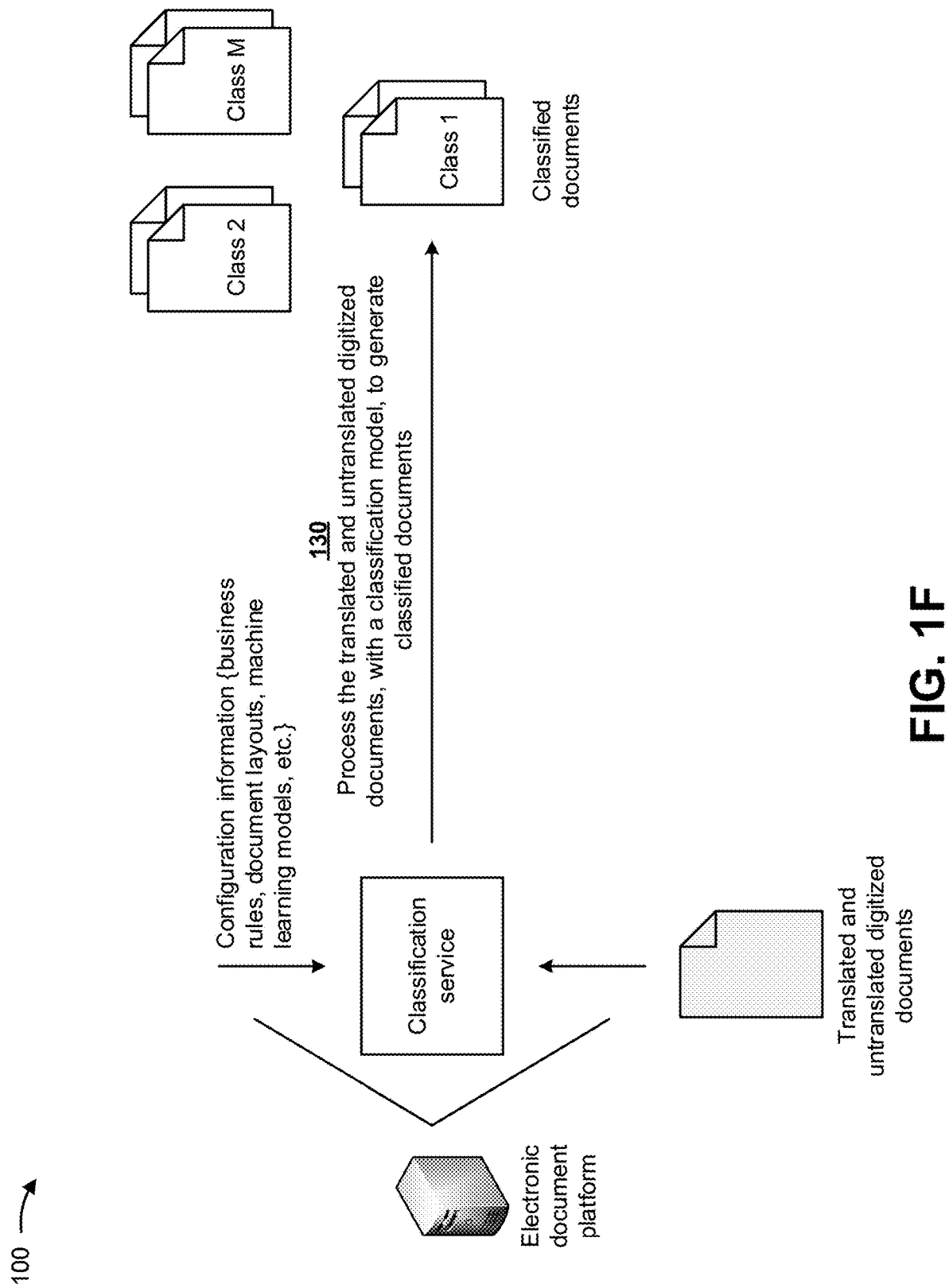
Figure 1G:
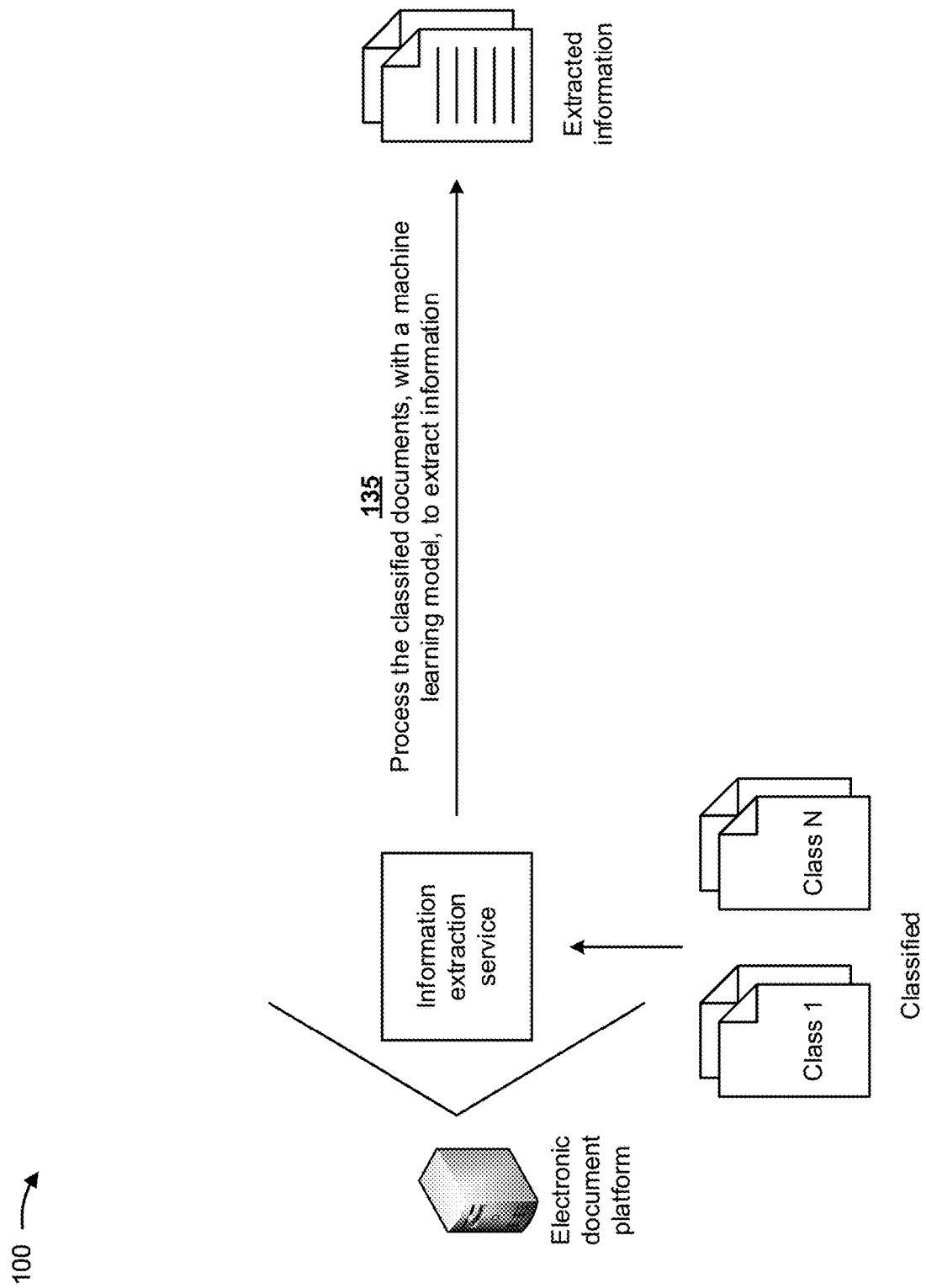
Figure 1H:
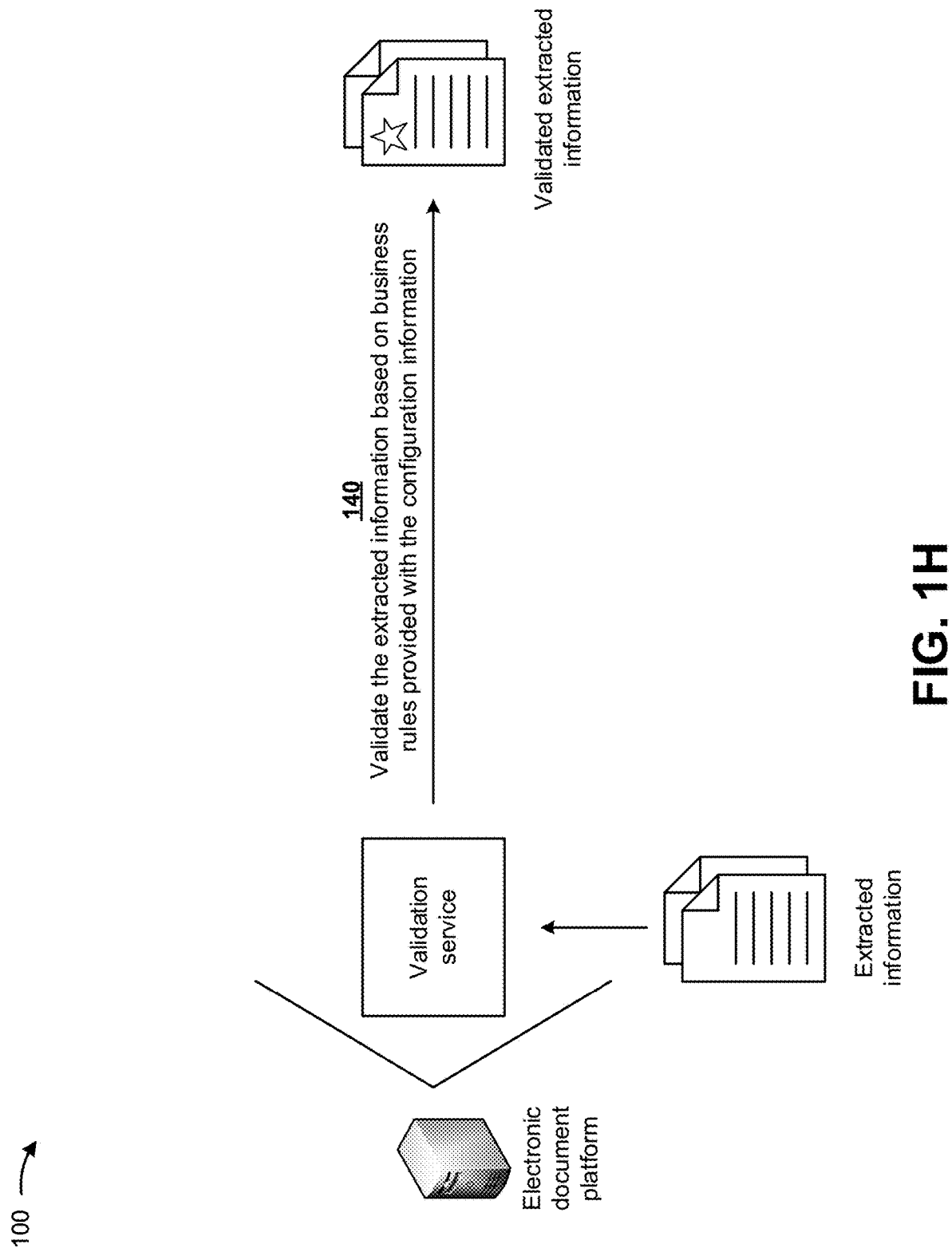
Figure 1I:
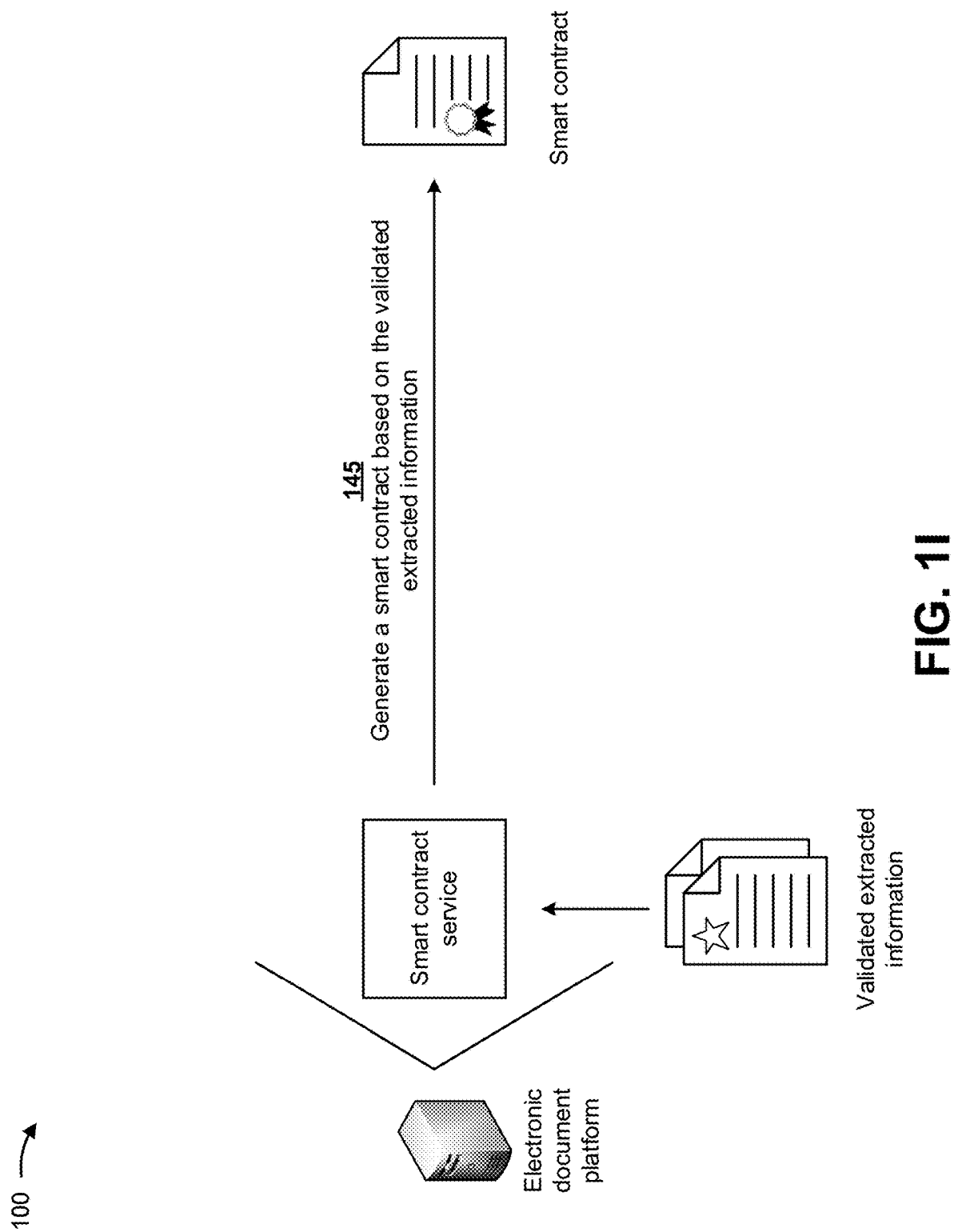
Figure 1J:
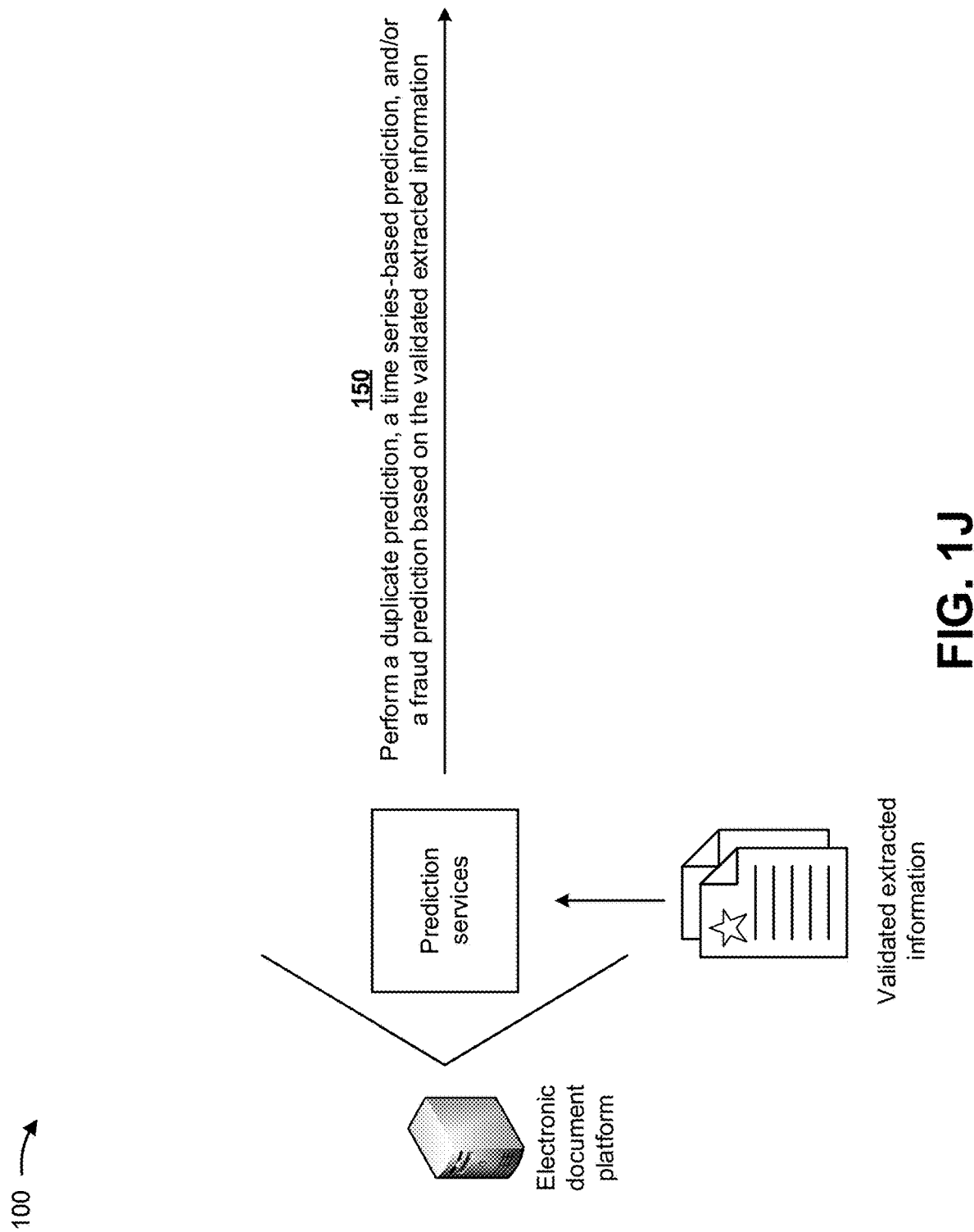
Figure 1K:
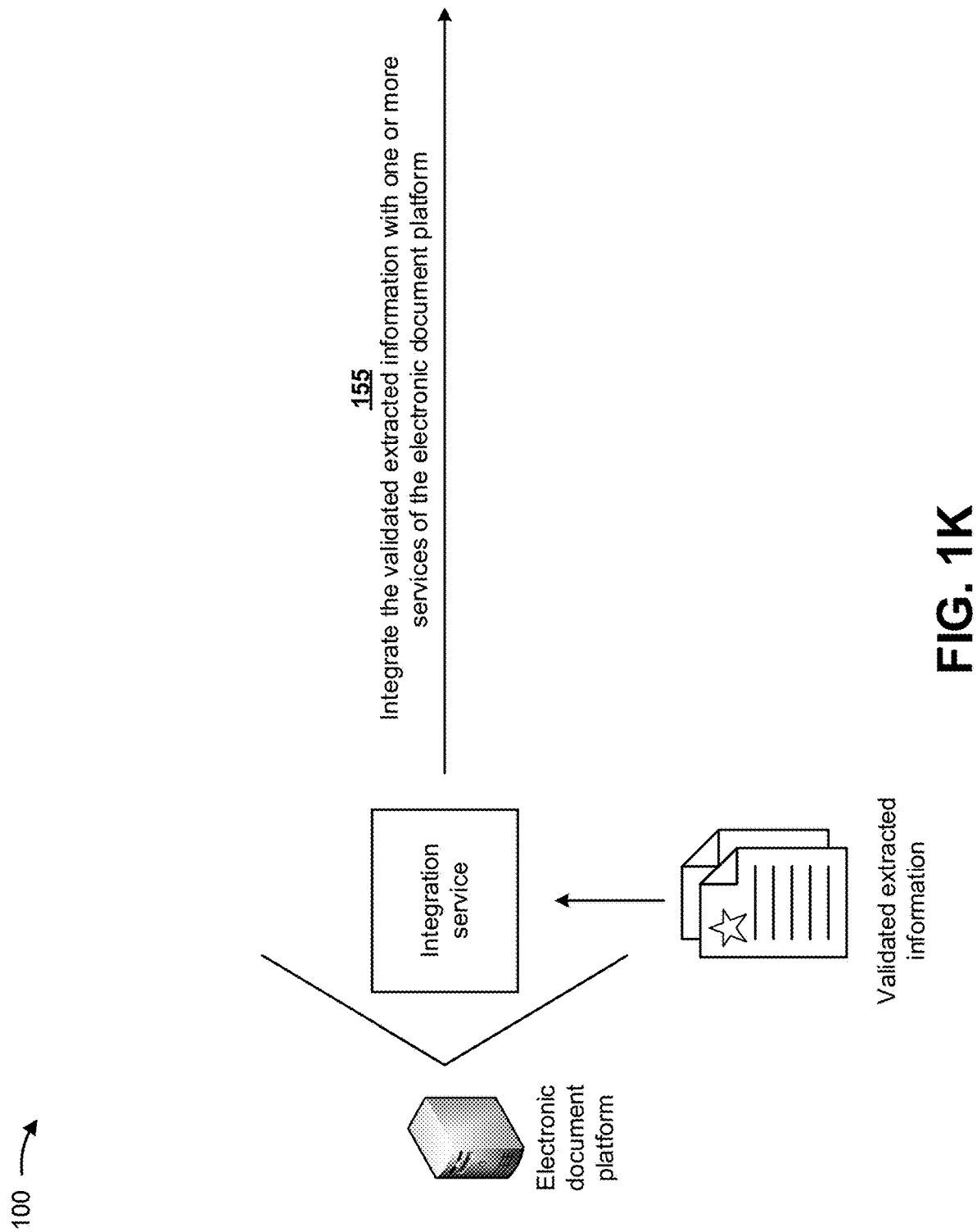
Figure 1L:
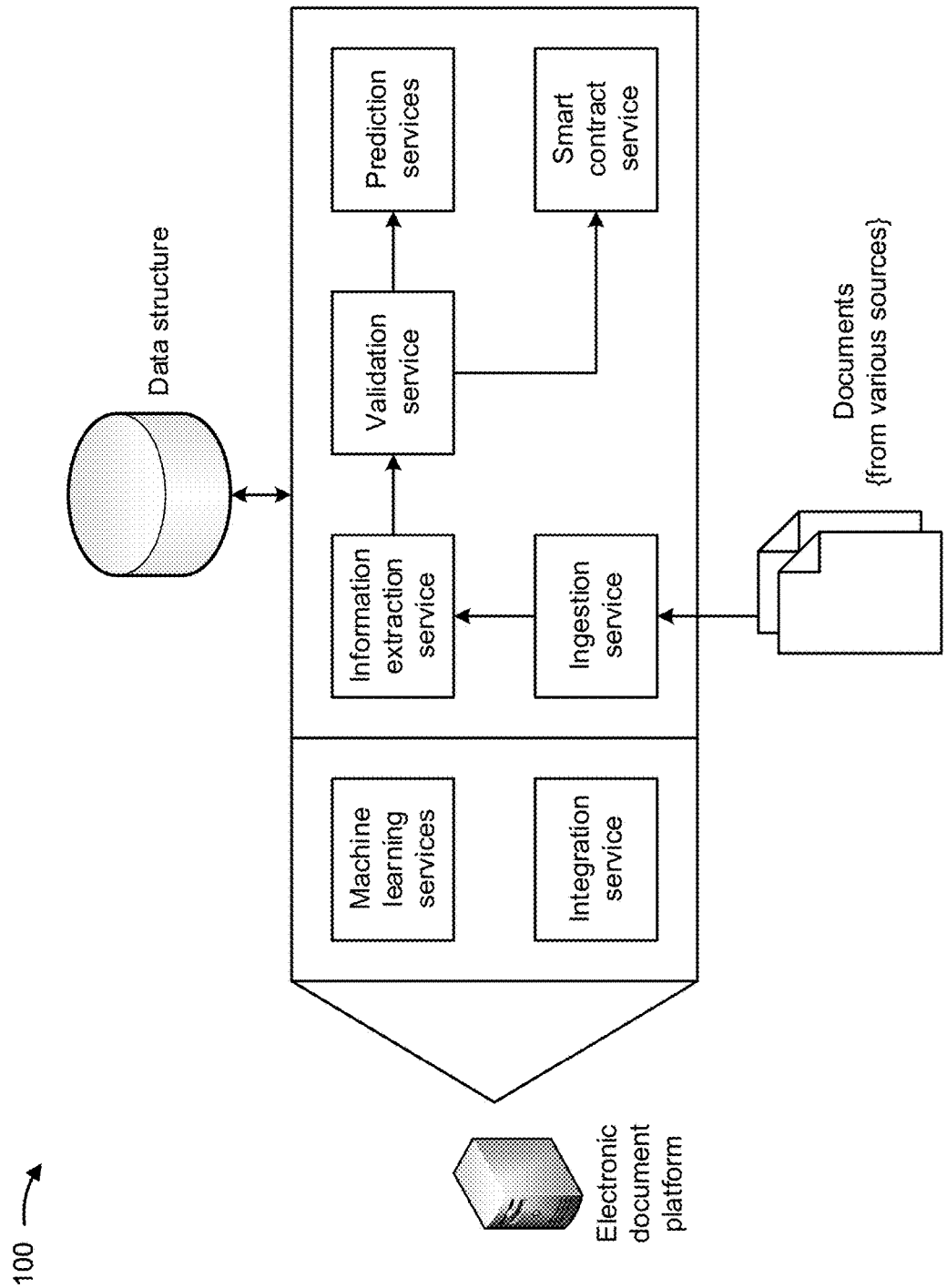
Figure 1M:
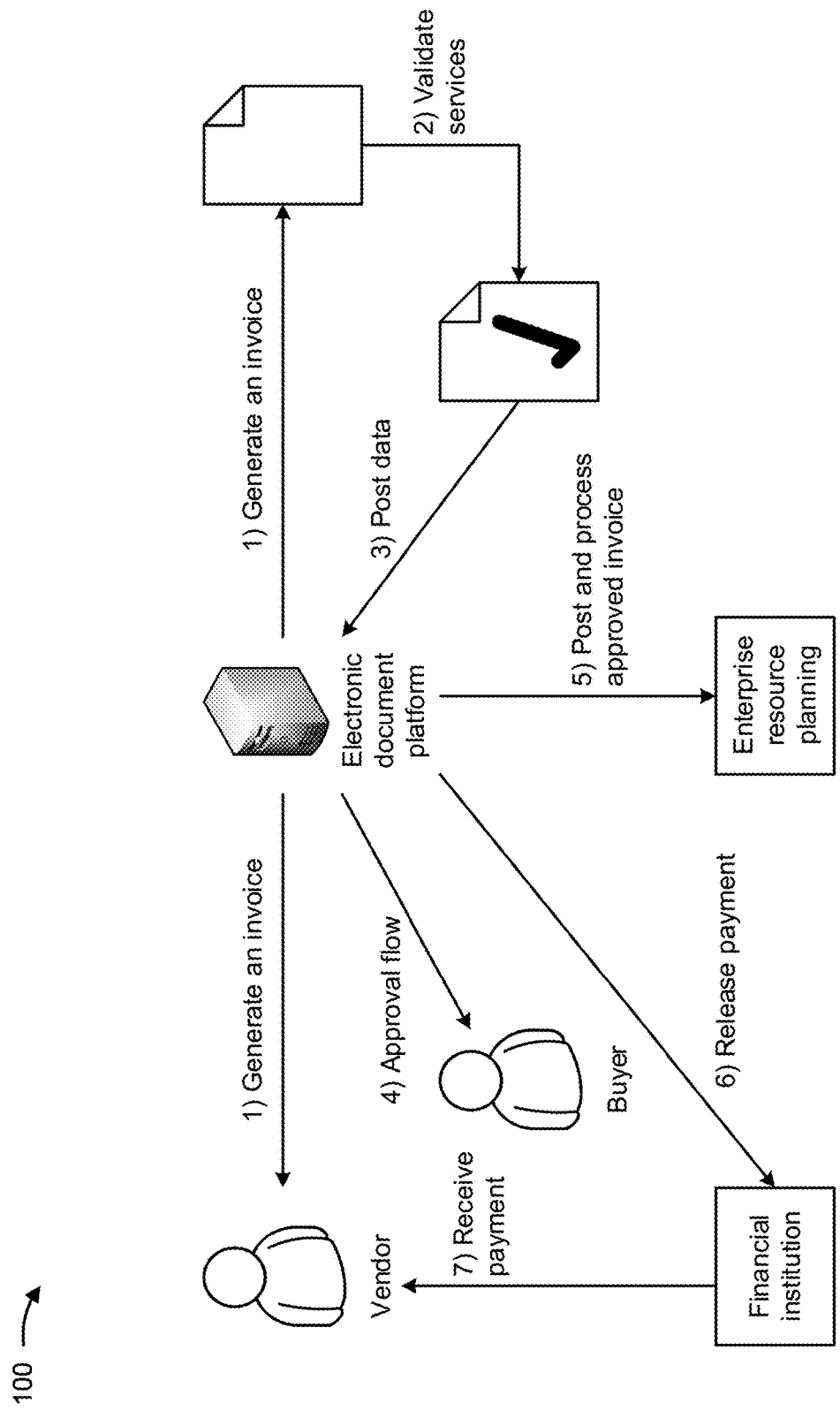
Figure 1N:
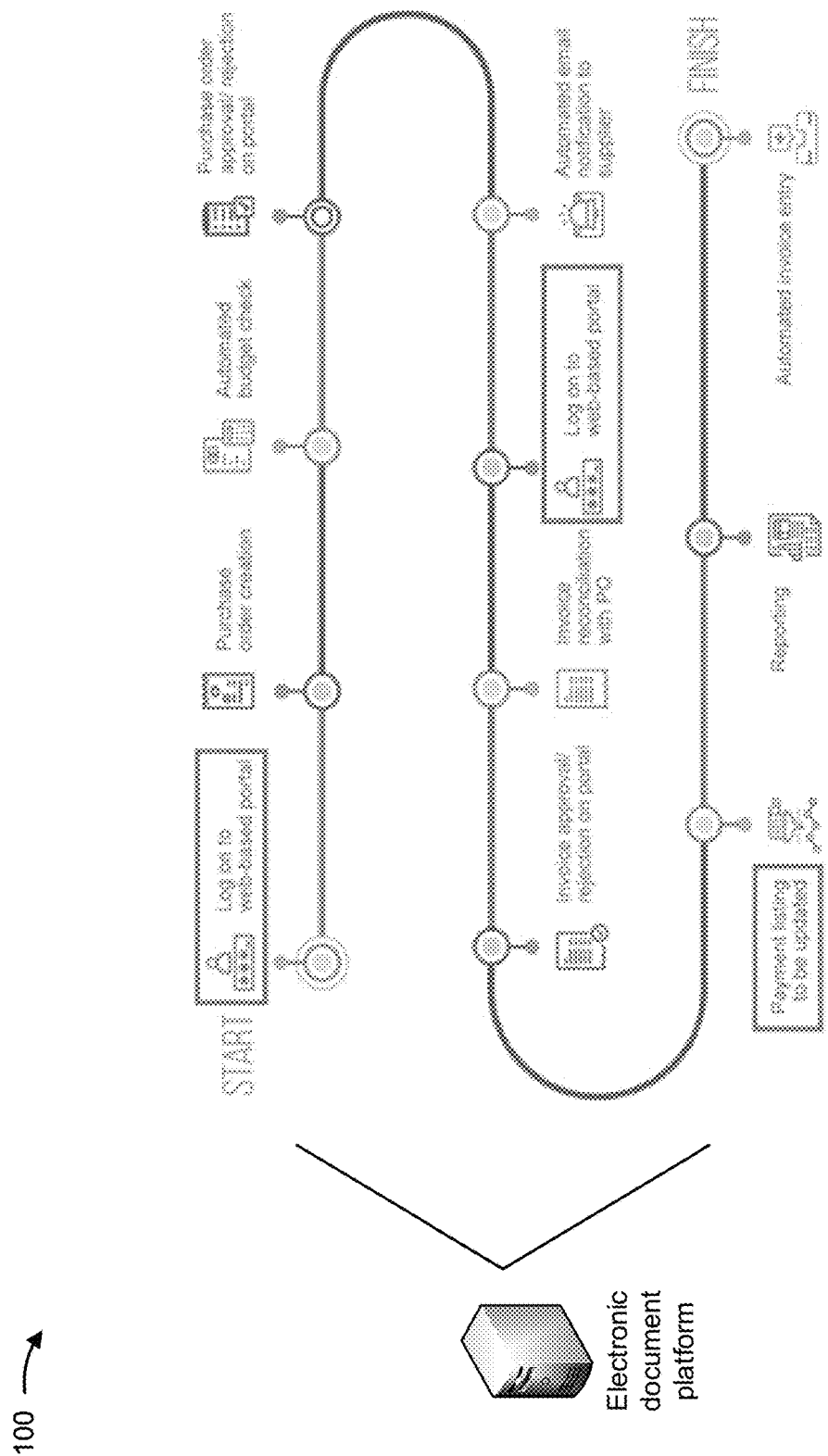

FIGS. 1A-1N are diagrams of an example implementation 100 described herein. As shown in FIG. 1A, a client device may be associated with an electronic document platform. In some implementations, a user may be associated with the client device and may cause the client device to provide, to the electronic document platform, instructions for setting up or configuring the electronic document platform.

As further shown in FIG. 1A, and by reference number 105, the electronic document platform may receive, from the client device, the instructions for configuring the electronic document platform. In some implementations, the electronic document platform may utilize the instructions to configure the electronic document platform, and/or may store the instructions in a data structure (e.g., a database, a table, a list, and/or the like) associated with the electronic document platform. In some implementations, the instructions may include information indicating how to manage client devices, users, processes, documents, data, outputs, and/or the like; information indicating how to set up smart contracts, business rules, workflows, classifications, digitalization, and/or the like; and/or the like. In some implementations, the electronic document platform may provide an end-to-end solution for different processes (e.g., for an invoice process the electronic document platform may be a middleman between a buyer, a vendor, and a financial institution for a transaction), different documents (e.g., the electronic document platform may control communication of a purchase order, matching of the purchase with an invoice, payment of the invoice, and/or the like), different users or peer types (e.g., buyers, vendors, financial institutions, suppliers, and/or the like), and/or the like.

With regard to client management, the user may instruct the electronic document platform to manage existing client devices, set up new client devices for accessing the electronic document platform, update information associated with existing client devices, remove access to the electronic document platform for existing client devices, and/or the like. With regard to user management, the user may instruct the electronic document platform to manage existing users of the electronic document platform, set up new users for the electronic document platform, update information associated with existing users of the electronic document platform, remove access to the electronic document platform for existing users, and/or the like.

With regard to process management, the user may instruct the electronic document platform to manage processes (e.g., invoice processes, loan processes, and/or the like) for each client device, create new processes to be managed by the electronic document platform, update existing processes managed by the electronic document platform, delete existing processes managed by the electronic document platform, and/or the like. With regard to document management, the user may instruct the electronic document platform to manage document types (e.g., purchase orders and credit notes for invoice processes, mortgage documents for loan processes, and/or the like) for each process, create new document types to be managed by the electronic document platform, update existing document types managed by the electronic document platform, delete existing document types managed by the electronic document platform, and/or the like.

With regard to setting up smart contracts, the user may instruct the electronic document platform to manage peer types (e.g., buyers, suppliers, logistic personnel, financial institutions, etc. for invoice processes) for each of the document types, create new peer types to be managed by the electronic document platform, update existing peer types managed by the electronic document platform, delete existing peer types managed by the electronic document platform, and/or the like. With regard to setting up business rules, the user may instruct the electronic document platform about business rules to be utilized by the electronic document platform for each document type, validation rules to be utilized by the electronic document platform for each document type, how to provide input to validation services, and/or the like.

With regard to setting up workflows, the user may instruct the electronic document platform about how to set up workflows for each document type and based on the business rules, how to set up approval and review workflows for each documents type, and/or the like. With regard to setting up classifications, the user may instruct the electronic document platform about how to set up data classifications for documents, such as data classifications associated with business rules, data classifications associated with machine learning models, and/or the like. With regard to setting up digitalization, the user may instruct the electronic document platform about digitalization of non-digitized input data based on document type and/or the input data.

As shown in FIG. 1B, and by reference number 110, an ingestion service of the electronic document platform may receive documents from various sources. In some implementations, the ingestion service may support multiple ingestion mechanism, such as application programming interface (API) based integration mechanisms, email systems, shared folders, secure shell (SSH) file transfer protocol (SFTP), SharePoint, and/or the like. In this way, the electronic document platform may receive the documents in a variety of formats from more sources. In some implementations, the documents may include documents associated with manufacturing operations (e.g., user manuals for manufacturing equipment, documents indicating throughput for manufacturing equipment, documents indicating utilization of manufacturing equipment, and/or the like); documents associated with accounting operations (e.g., purchase orders, invoices, documents indicating accounting procedures, and/or the like); documents associated with entities (e.g., agreements with buyers, suppliers, financial institutions, etc., documents indicating throughputs of suppliers, documents indicating requested products and/or services from buyers, and/or the like); and/or the like.

As further shown in FIG. 1B, the electronic document platform may store the documents in a data structure (e.g., a database, a table, a list, and/or the like) associated with the electronic document platform. In some implementations, the electronic document platform may store the documents in the data structure in forms received from the various sources. In some implementations, the electronic document platform may process the documents to generate processed documents (e.g., digitized documents), as described below, and may store the processed documents in the data structure.

As shown in FIG. 1C, and by reference number 115, a digitalization service of the electronic document platform may process the documents, with an optical character recognition (OCR) engine, to generate digitized documents. In some implementations, the OCR engine may include an OmniPage OCR engine, a Google Cloud Vision API OCR engine, Microsoft Azure Computer Vision API OCR engine, an IBM Bluemix OCR engine, and/or the like. In some implementations, the OCR engine may convert the documents into an electronic format (e.g., the digitized documents). Optical character recognition involves a conversion of images of typed, handwritten, or printed text into machine-encoded text. For example, OCR may be applied to a scanned document, a photo of a document, a photo of a scene that includes text, and/or the like, to produce electronic data (e.g., text data). OCR can be used as a form of information entry from printed paper data records (e.g., printed forms, printed tables, printed reports, identification documents, invoices, bank statements, and/or the like). Converting printed text to electronic data allows the information represented by the printed text to be electronically edited, searched, stored more compactly, displayed online, and/or used in machine processes such as cognitive computing, machine translation, (extracted) text-to-speech, key data and text mining, and/or the like. Implementations of OCR may employ pattern recognition, artificial intelligence, computer vision, and/or the like.

In some implementations, the electronic document platform may utilize one or more pre-processing techniques to pre-process the documents and to generate the pre-processed documents, such as data cleansing techniques, data reduction techniques, data transformation techniques, feature extraction techniques, and/or the like. In some implementations, the electronic document platform may select the one or more pre-processing techniques based on a variety of factors, such as types associated with the documents, whether sources of the documents provide voluminous data that needs to be cleaned and/or reduced in size, whether the documents are provided in a format that requires conversion to a particular format that may be utilized by the electronic document platform, and/or the like.

In some implementations, the data cleansing techniques may include techniques that detect and correct (or remove) corrupt or inaccurate records from the documents, and that identify incomplete, incorrect, inaccurate, or irrelevant portions of the documents and replace, modify, or delete the identified portions of the documents. In some implementations, the data reduction techniques may include techniques that transform numerical or alphabetical digital information (e.g., the documents) into a corrected, ordered, and simplified form, and that reduce a quantity of the documents to meaningful parts. For example, if the documents are derived from instrument readings, the data reduction techniques may edit, scale, code, sort, collate, produce tabular summaries, and/or the like from the instrument readings.

In some implementations, the data transformation techniques may include techniques that convert the documents from one format or structure into another format or structure. The data transformation may be simple or complex based on required changes to the documents between the source (initial) data and the target (final) data. In some implementations, the feature extraction techniques may include techniques that start from an initial set of data (e.g., the documents) and create derived values (e.g., features) intended to be informative and non-redundant. The feature extraction techniques may facilitate subsequent learning and generalization, and may lead to improved interpretations.

In some implementations, the electronic document platform may pre-process the documents by determining correlations, general trends, outliers, and/or the like associated with the documents, and by performing an analysis of the documents based on histograms, scatter plots, box plots, and/or the like determined based on the correlations, general trends, outliers, and/or the like associated with the documents. In such implementations, the electronic document platform may further pre-process the documents by cleaning the documents based on inconsistent values, duplicate records, invalid entries, and/or the like, by merging duplicate records based on industry-specific domain knowledge, and by transforming and scaling the documents using data manipulation and feature detection.

As shown in FIG. 1D, and by reference number 120, a language detection service of the electronic document platform may process the digitized documents, with a machine learning model, to detect languages utilized in the digitized documents. For example, as shown, the electronic document platform may detect a first language (e.g., language 1 or English) through an Nth language (e.g., language N or Spanish) in the digitized documents. In some implementations, the machine learning model used to detect languages utilized in the digitized documents may include a Google API machine learning model, a Microsoft Azure API machine learning model, an IBM Bluemix API machine learning model, a classifier machine learning model, and/or the like.

In some implementations, the electronic document platform may perform a training operation on the machine learning model with the digitized documents or with information that includes different languages (e.g., English, French, German, and/or the like). For example, the electronic document platform may separate the digitized documents into a training set, a validation set, a test set, and/or the like. In some implementations, the electronic document platform may train the machine learning model using, for example, an unsupervised training procedure and based on the training set of the digitized documents. For example, the electronic document platform may perform dimensionality reduction to reduce the digitized documents to a minimum feature set, thereby reducing resources (e.g., processing resources, memory resources, and/or the like) to train the machine learning model, and may apply a classification technique, to the minimum feature set.

In some implementations, the electronic document platform may use a logistic regression classification technique to determine a categorical outcome (e.g., that a document includes a particular language). Additionally, or alternatively, the electronic document platform may use a naïve Bayesian classifier technique. In this case, the electronic document platform may perform binary recursive partitioning to split the digitized documents into partitions and/or branches, and use the partitions and/or branches to perform predictions (e.g., that a document includes a particular language). Based on using recursive partitioning, the electronic document platform may reduce utilization of computing resources relative to manual, linear sorting and analysis of data points, thereby enabling use of thousands, millions, or billions of data points to train the machine learning model, which may result in a more accurate model than using fewer data points.

Additionally, or alternatively, the electronic document platform may use a support vector machine (SVM) classifier technique to generate a non-linear boundary between data points in the training set. In this case, the non-linear boundary is used to classify test data into a particular class.

Additionally, or alternatively, the electronic document platform may train the machine learning model using a supervised training procedure that includes receiving input to the machine learning model from a subject matter expert, which may reduce an amount of time, an amount of processing resources, and/or the like to train the machine learning model of activity automatability relative to an unsupervised training procedure. In some implementations, the electronic document platform may use one or more other model training techniques, such as a neural network technique, a latent semantic indexing technique, and/or the like. For example, the electronic document platform may perform an artificial neural network processing technique (e.g., using a two-layer feedforward neural network architecture, a three-layer feedforward neural network architecture, and/or the like) to perform pattern recognition with regard to patterns of whether a document includes a particular language. In this case, using the artificial neural network processing technique may improve an accuracy of the trained machine learning model generated by the electronic document platform by being more robust to noisy, imprecise, or incomplete data, and by enabling the electronic document platform to detect patterns and/or trends undetectable to human analysts or systems using less complex techniques.

As shown in FIG. 1E, and by reference number 125, a translation service of the electronic document platform may process the digitized documents in other languages (e.g., other than English), with a machine learning model, to translate the digitized documents into a common language (e.g., English) and to generate translated digitized documents. In some implementations, the machine learning model used to translate the digitized documents into the common language may include a Google Translate model, a Microsoft Azure Translator Text model, an IBM Watson Language Translator model, a classifier machine learning model, a deep learning model, a long short-term memory network (LSTM) model, a recurrent neural network (RNN) model, a bidirectional RNN model, a sequence to sequence model, and/or the like.

In some implementations, the electronic document platform may perform a training operation on the machine learning model with the digitized documents or with information that includes different languages (e.g., English, French, German, and/or the like) and translations of the different languages to a common language (e.g., English), as described above in connection with the machine learning model of FIG. 1E.

In some implementations, the electronic document platform may translate a subset of the digitized documents, may translate all of the digitized documents, may skip translation of particular documents (e.g., documents that do not require a translation since they are provided in a common language), and/or the like. Skipping translation of documents may conserve computing resources (e.g., processing resources, memory resources, and/or the like), and the electronic document platform may detect such documents based on analyzing the documents or by document type. In some implementations, the common language for the documents may be different for each transaction, depending upon the parties to the transaction (e.g., one transaction may involve parties that all speak French and provide documents in French, whereas another transaction may include a party that speaks English and provides documents in English and another party that speaks German and provides documents in German).

As shown in FIG. 1F, a classification service of the electronic document platform may receive the translated digitized documents and untranslated digitized documents (e.g., the digitized documents in the common language and that do not require translation), and configuration information. In some implementations, the configuration information may include information included in the instructions provided by the user (e.g., as described above in connection with FIG. 1A), business rules, document layouts, machine learning models described herein, and/or the like. In some implementations, the business rules may include rules that define or constrain some aspect of business and resolve to either true or false. Business rules may assert a business structure and/or may control or influence the behavior of the business. Business rules describe operations, definitions, and constraints that apply to an organization, and may apply to people, processes, corporate behavior, and computing systems in an organization. For example, a business rule might state that no credit check is to be performed on return customers, another business rule may require a rental agent to disallow a rental tenant if a credit rating is too low, another business rule may require company agents to use a list of preferred suppliers and supply schedules, and/or the like.

As further shown in FIG. 1F, and by reference number 130, the classification service of the electronic document platform may process the translated documents and the untranslated documents, with a classification model and based on the configuration information, to generate classified documents (e.g., classes of documents). For example, the electronic document platform may generate a first class of documents (e.g., class 1), a second class of documents (e.g., class 2), . . . , and an Mth class of documents (e.g., class M). In some implementations, the classification model may include a model that attempts to draw some conclusion from observed values. Given one or more inputs, a classification model will try to predict the value of one or more outcomes (e.g., labels that can be applied to a dataset). In some implementations, the classification model may include a logistic regression model, a decision tree model, a random forest model, a gradient-boosted tree model, a multilayer perceptron model, a one-vs-rest model, a naïve Bayes model, a support vector machine model, a linear regression model, a linear discriminant analysis model, a k-nearest neighbor model, a neural network model, and/or the like.

In some implementations, the electronic document platform may perform a training operation on the classification model with the digitized documents or with information that includes different classes of documents (e.g., manufacturing documents, financial documents, regulatory documents, and/or the like), as described above in connection with the machine learning model of FIG. 1F.

As shown in FIG. 1G, and by reference number 135, an information extraction service of the electronic document platform may process the classified documents, with a machine learning model, to extract information from the classified documents and to generate extracted information. In some implementations, the extracted information may include information indicating process types associated with the classified documents (e.g., an invoice process, a business transaction, a loan process, and/or the like); information indicating document types associated with the classified documents (e.g., purchase orders and credit notes for an invoice process, a buyer, a vendor, and financial institution in a transaction, a mortgage for a loan process, and/or the like); information indicating peer types associated with the classified documents (e.g., buyers, vendors or suppliers, financial institutions, etc. for invoice processes and transactions); and/or the like.

In some implementations, the machine learning model used to extract information from the classified documents may include a deep neural network model, a RNN model, a LSTM model, a gated recurrent network (GRU) model, a bidirectional LSTM-conditional random fields (CRF) model, and/or the like. In some implementations, the electronic document platform may perform a training operation on the machine learning model with the classified documents or with information that includes different extracted information (e.g., process types, document types, peer types, and/or the like), as described above in connection with the machine learning model of FIG. 1G.

As shown in FIG. 1H, and by reference number 140, a validation service of the electronic document platform may validate the extracted information, based on the business rules provided with the configuration information, to generate validated extracted information. In some implementations, the electronic document platform may validate the extracted information when the extracted information complies with the business rules. In some implementations, the electronic document platform may determine that a portion of the extracted information does not comply with the business rules, and may not validate the portion of the extracted information.

As shown in FIG. 1I, and by reference number 145, a smart contract service of the electronic document platform may generate a smart contract based on the validated extracted information. In some implementations, the smart contract may include a computer protocol that digitally facilitates, verifies, and/or enforces negotiation or performance of a contract. The smart contracts may enable performance of credible transactions without third parties, and the transactions are trackable and irreversible.

In some implementations, the electronic document platform may identify information associated with a transaction from the extracted information, and may generate the smart contract for the transaction, wherein the smart contract is to be used to facilitate processing of documents associated with performance of the transaction. In some implementations, the electronic document platform may determine that a buyer wishes to purchase a product or a service based on the extracted information. For example, the extracted information may include inventory information indicating that the buyer is running low on the product and/or the service. Based on this determination, the electronic document platform may determine that the buyer needs to conduct a transaction to purchase more of the product and/or the service.

In such implementations, the electronic document platform may identify a vendor of the product and/or the service based on the extracted information. For example, the extracted information may include production information indicating that the vendor has plenty of product and/or the service to supply the buyer (e.g., at a cheapest price, with guaranteed delivery in time to prevent inventory depletion, and/or the like. The extracted information may include financial information indicating that the buyer and the seller both have accounts at a financial institution and that both the buyer and the seller have utilized the financial institution for transaction payments.

Thus, the electronic document platform may determine that the transaction is associated with the buyer of the product and/or the service, the vendor of the product and/or the service, and the financial institution to provide payment to the vendor from an account of the buyer at the financial institution. In such implementations, the electronic document platform may provide the smart contract (e.g., which may act like a purchase order and/or an invoice for the product and/or the service, a request to pay the vendor, and/or the like at different stages of the transaction) to a client device associated with the vendor, may receive an approval of the smart contract from a client device of the buyer, and may provide, to a client device of the financial institution, information instructing the financial institution to provide the payment to the vendor. Furthermore, the electronic document platform may include, in the smart contract, information associated with the buyer, the vendor, and the financial institution.

In some implementations, the electronic document platform may automatically perform tax calculations for the transaction based on the validated extracted information and/or the smart contract, and may automatically prepare a tax submission document for the transaction based on the validated extracted information and/or the smart contract. In some implementations, the electronic document platform may automatically perform a legal compliance check for the transaction based on the validated extracted information, and may automatically generate a digital signature for the smart contract based on the legal compliance check.

In some implementations, the electronic document platform may provide secure communication of the smart contract between the electronic document platform, the client device of the buyer, the client device of the vendor, and the client device of the financial institution. For example, the electronic document platform may encrypt the smart contract (e.g., an encryption mechanism, such as an encryption key), and may provide the encrypted smart contract to the client device of the buyer, the client device of the vendor, and the client device of the financial institution.

In some implementations, the electronic document platform may process the validated extracted information, with a machine learning model, to recommend multiple buyers, multiple vendors, multiple financial institutions for the transaction. For example, the electronic document platform may determine that the multiple buyers, vendors, and financial institutions are capable of handling the transaction. In such implementations, the electronic document platform may automatically select the buyer from the multiple buyers, the vendor from the multiple vendors, and the financial institution from the multiple financial institutions. For example, the electronic document platform may select the buyer who provides a best offer for the product and/or the service, a vendor who provides a cheapest price for the product and/or the service, a financial institution that charges a cheapest fee for handling the payment, and/or the like.

As shown in FIG. 1J, and by reference number 150, a prediction service of the electronic document platform may perform a duplicate prediction, a time series-based prediction, and/or a fraud prediction based on the validated extracted information. With regard to the duplicate prediction, the electronic document platform may determine whether a request (e.g., a request for the transaction) identified in the validated extracted information is a duplicate request (e.g., the transaction has already been processed by the electronic document platform). For example, the electronic document platform may determine whether the transaction is a duplicate transaction based on comparing information associated with transaction with historical information stored by the electronic document platform (e.g., information identifying prior completed transactions handled by the electronic document platform). With regard to the time series-based prediction, the electronic document platform may predict a volume, a price, and/or other terms for a transaction based on the validated extracted information. For example, the electronic document platform may predict a volume and a price for the transaction based on an inventory of the buyer for a product, current market prices for the product, a turnaround time for the product, and/or the like. With regard to the fraud prediction, the electronic document platform may predict whether a transaction is fraudulent based on the validated extracted information. For example, the electronic document platform may determine whether the transaction is fraudulent based on a model of fraud, information indicating fraudulent activities similar to the transaction, historical transaction information, and/or the like.

As shown in FIG. 1K, and by reference number 155, an integration service of the electronic document platform may integrate the validated extracted information with one or more of the services of the electronic document platform described above. For example, if the prediction service of the electronic document platform determines that the transaction is fraudulent, the integration service may provide this information to one or more of the services of the electronic document platform so that similar transactions may be identified as fraudulent and not processed by the electronic document platform. In this way, the electronic document platform may conserve computing resources (e.g., processing resources, memory resources, and/or the like) associated with unnecessarily processing information.

As shown in FIG. 1L, the electronic document platform may include machine learning services (e.g., services that provide and manage the machine learning models described herein), the integration service, the information extraction service, the ingestion service, the validation service, the prediction service, and the smart contract service. As further shown, the electronic document platform is associated with the data structure and the ingestion service receives the documents. The ingestion service provides the documents to the information extraction service, and the information extraction service extracts information and provides the information to the validation service. The validation service validates the information and provides the validated information to the prediction service and the smart contract service. The prediction service performs the predictions, described above, based on the validated information, and the smart contract service provides generates the smart contract based on the validate information.

FIG. 1M provides an example of how a transaction is conducted. Assume that, based on analyzing the extracted information, the electronic document platform determines that a buyer is running low on a product and needs to purchase more of the product. Based on the extracted information, the electronic document platform may identify multiple vendors that provide the product, and may select a vendor from the multiple vendors based on prices offered by the vendors for the product, turnaround times for the product associated with the vendors, prior interactions between the buyer and the vendors, and/or the like. Based on the extracted information, the electronic document platform may identify multiple financial institutions to handle payment of the buyer to the vendor for the product, and may select a financial institution from the multiple financial institutions based on fees charged by the financial institutions, prior interactions between the buyer or the vendor and the financial institutions, and/or the like. Further assume that the electronic document platform informs the buyer, the vendor, and the financial institution about the transaction, and that the buyer approves the transaction. The electronic document platform may generate a purchase order for the product, and may provide the purchase order to the vendor. The vendor may provide the product to the buyer based on the terms of the purchase order, and may inform the electronic document platform that the product has been provided to the buyer.

As shown in FIG. 1M, the electronic document platform may generate an invoice for the transaction (e.g., for provision of the product from the vendor to the buyer), and may provide the invoice to the vendor. The electronic document platform may validate services requested in the invoice (e.g., provision of the product) by confirming that the product has been provided from the vendor to the buyer (e.g., and that the buyer accepts the product, the product meets certain standards, and/or the like). The electronic document platform may post data indicating that the invoice is validated based on confirming that the product has been provided from the vendor to the buyer. The electronic document platform may request approval of the invoice from the buyer, and, upon approval from the buyer, may post and process the approved invoice with an enterprise resource planning system (e.g., that handles inventory management) associated with the buyer. For example, the electronic document platform may update the enterprise resource planning system to increase an inventory of the product based on the transaction. Upon approval of the invoice by the buyer, the electronic document platform may instruct the financial institution to release payment (e.g., from the buyer's account) for the approved invoice, and the financial institution may provide the payment to the vendor.

FIG. 1N provides an example of how a purchase order is generated and an invoice is approved. As shown, the electronic document platform may create the purchase order for a buyer based on the extracted information. For example, based on analyzing the extracted information, the electronic document platform may determine that a buyer is running low on a product and needs to purchase more of the product. The electronic document platform may automatically perform a budget check of the purchase order (e.g., to ensure that purchase order does not exceed a budget of the buyer). The electronic document platform may approve or reject the purchase order based on the budget check for the purchase order. In some implementations, the electronic document platform may request approval of the purchase order from the buyer.

If the purchase order is approved by the buyer, the electronic document platform may automatically provide, to a supplier, a notification indicating work requested by the supplier in the purchase order. The supplier may perform the work requested in the purchase order (e.g., may produce the product requested in the purchase order). The supplier may generate an invoice for performance of the work or the electronic document platform may generate the invoice and seek approval of the invoice from the supplier. The electronic document platform may reconcile the invoice with the purchase order by comparing information contained in the purchase order and the invoice to ensure a match (e.g., matching quantities of the product, matching prices for the product, and/or the like). The electronic document platform may approve or reject the invoice based on reconciling the invoice with the purchase order. In some implementations, the electronic document platform may request approval of the invoice from the buyer. The electronic document platform may instruct payment of the invoice if the invoice is approved. The electronic document platform may report the invoice and payment of the invoice (e.g., the buyer and the supplier), and may automatically enter the invoice in accounting systems associated with the buyer and the supplier.

In some implementations, the electronic document platform may provide an EDI service. An EDI message may contain a string of data elements, each of which represents a singular fact (e.g., called a data segment), such as a price, a product model number, etc., separated by delimiter. One or more data segments framed by a header and a trailer may form a transaction set, which is an EDI unit of transmission. A transaction set may include information provided in a typical business document or form. When sending an EDI document, both parties or trading partners may adhere to a same set of rules. Translation software of the electronic document platform may process the information differently for sent and received messages and may perform a complete audit of each step to ensure that information is sent or received in an EDI format. When the electronic document platform reads a document, the electronic document platform knows where to find buyer's company name, an order number, purchases items, a price, and/or the like. This information may be sent to a receiver's order entry system without necessitating manual order entry. In some implementations, the EDI service of the electronic document platform may support multiple communication mechanisms (e.g., the Internet, mobile devices, a web browser, a secure network, encryption, and/or the like).

In this way, several different stages of the process for providing automation and digitalization of document processing systems may be automated, which may remove human subjectivity and waste from the process, and which may improve speed and efficiency of the process and conserve computing resources (e.g., processing resources, memory resources, and/or the like). Furthermore, implementations described herein use a rigorous, computerized process to perform tasks or roles that were not previously performed or were previously performed using subjective human intuition or input. For example, currently there does not exist a technique that provides automation and digitalization of document processing systems. Finally, providing automation and digitalization of document processing systems conserves computing resources (e.g., processing resources, memory resources, and/or the like) that would otherwise be wasted in attempting to process and handle hard copies of documents.

As indicated above, FIGS. 1A-1N are provided merely as examples. Other examples are possible and may differ from what was described with regard to FIGS. 1A-1N.

Figure 2:
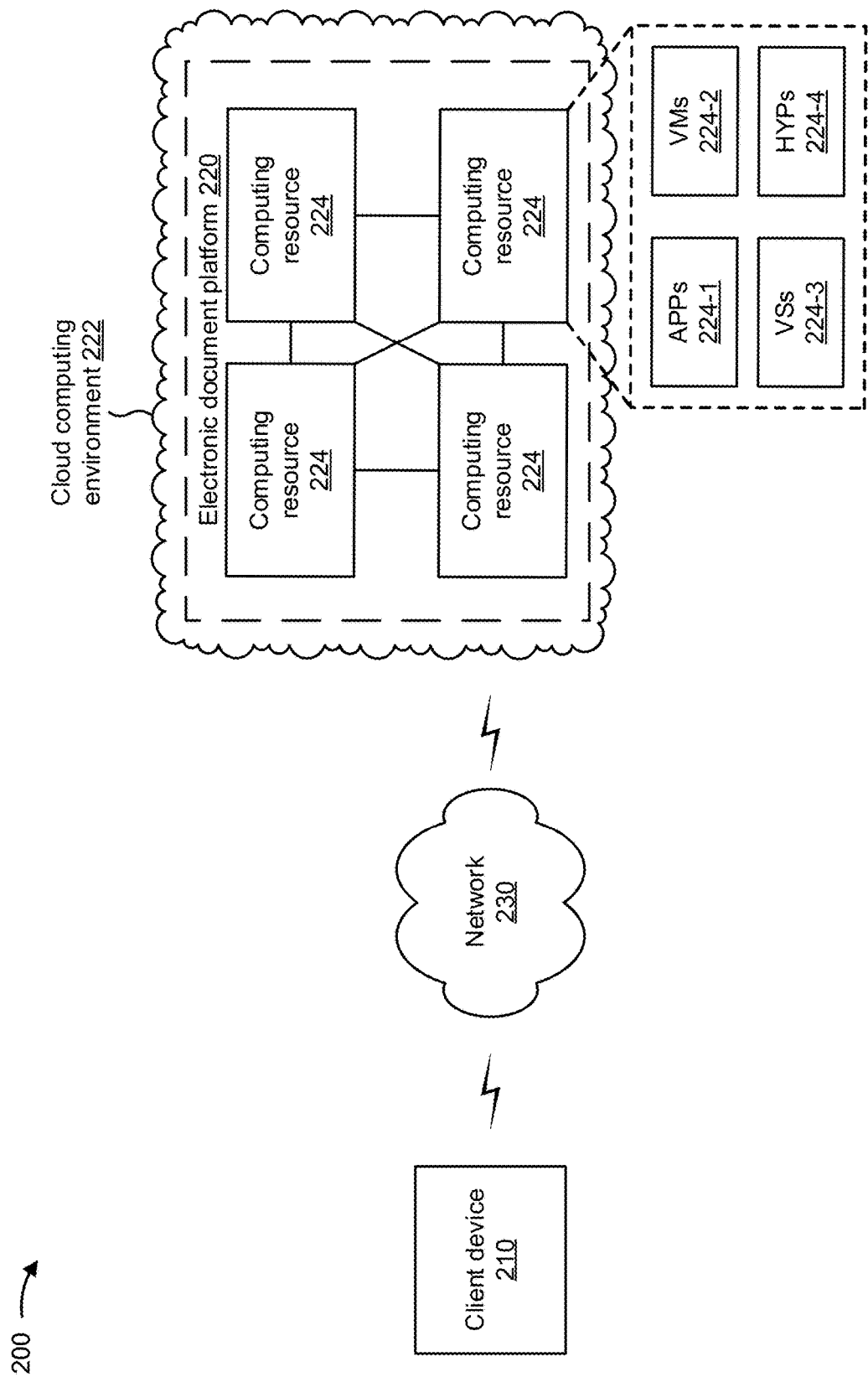
FIG. 2 is a diagram of an example environment in which systems and/or methods, described herein, may be implemented.

FIG. 2 is a diagram of an example environment 200 in which systems and/or methods, described herein, may be implemented. As shown in FIG. 2, environment 200 may include a client device 210, an electronic document platform 220, and a network 230. Devices of environment 200 may interconnect via wired connections, wireless connections, or a combination of wired and wireless connections.

Client device 210 includes one or more devices capable of receiving, generating, storing, processing, and/or providing information, such as information described herein. For example, client device 210 may include a mobile phone (e.g., a smart phone, a radiotelephone, etc.), a laptop computer, a tablet computer, a desktop computer, a handheld computer, a gaming device, a wearable communication device (e.g., a smart wristwatch, a pair of smart eyeglasses, etc.), or a similar type of device. In some implementations, client device 210 may receive information from and/or transmit information to electronic document platform 220.

Electronic document platform 220 includes one or more devices that provide automation and digitalization of document processing systems. In some implementations, electronic document platform 220 may be designed to be modular such that certain software components may be swapped in or out depending on a particular need. As such, electronic document platform 220 may be easily and/or quickly reconfigured for different uses. In some implementations, electronic document platform 220 may receive information from and/or transmit information to one or more client devices 210.

In some implementations, as shown, electronic document platform 220 may be hosted in a cloud computing environment 222. Notably, while implementations described herein describe electronic document platform 220 as being hosted in cloud computing environment 222, in some implementations, electronic document platform 220 may not be cloud-based (i.e., may be implemented outside of a cloud computing environment) or may be partially cloud-based.

Cloud computing environment 222 includes an environment that hosts electronic document platform 220. Cloud computing environment 222 may provide computation, software, data access, storage, etc. services that do not require end-user knowledge of a physical location and configuration of system(s) and/or device(s) that host electronic document platform 220. As shown, cloud computing environment 222 may include a group of computing resources 224 (referred to collectively as "computing resources 224" and individually as "computing resource 224").

Computing resource 224 includes one or more personal computers, workstation computers, server devices, or other types of computation and/or communication devices. In some implementations, computing resource 224 may host electronic document platform 220. The cloud resources may include compute instances executing in computing resource 224, storage devices provided in computing resource 224, data transfer devices provided by computing resource 224, etc. In some implementations, computing resource 224 may communicate with other computing resources 224 via wired connections, wireless connections, or a combination of wired and wireless connections.

As further shown in FIG. 2, computing resource 224 includes a group of cloud resources, such as one or more applications ("APPs") 224-1, one or more virtual machines ("VMs") 224-2, virtualized storage ("VSs") 224-3, one or more hypervisors ("HYPs") 224-4, and/or the like.

Application 224-1 includes one or more software applications that may be provided to or accessed by client device 210. Application 224-1 may eliminate a need to install and execute the software applications on client device 210. For example, application 224-1 may include software associated with electronic document platform 220 and/or any other software capable of being provided via cloud computing environment 222. In some implementations, one application 224-1 may send/receive information to/from one or more other applications 224-1, via virtual machine 224-2.

Virtual machine 224-2 includes a software implementation of a machine (e.g., a computer) that executes programs like a physical machine. Virtual machine 224-2 may be either a system virtual machine or a process virtual machine, depending upon use and degree of correspondence to any real machine by virtual machine 224-2. A system virtual machine may provide a complete system platform that supports execution of a complete operating system ("OS"). A process virtual machine may execute a single program, and may support a single process. In some implementations, virtual machine 224-2 may execute on behalf of a user (e.g., a user of client device 210 or an operator of electronic document platform 220), and may manage infrastructure of cloud computing environment 222, such as data management, synchronization, or long-duration data transfers.

Virtualized storage 224-3 includes one or more storage systems and/or one or more devices that use virtualization techniques within the storage systems or devices of computing resource 224. In some implementations, within the context of a storage system, types of virtualizations may include block virtualization and file virtualization. Block virtualization may refer to abstraction (or separation) of logical storage from physical storage so that the storage system may be accessed without regard to physical storage or heterogeneous structure. The separation may permit administrators of the storage system flexibility in how the administrators manage storage for end users. File virtualization may eliminate dependencies between data accessed at a file level and a location where files are physically stored. This may enable optimization of storage use, server consolidation, and/or performance of non-disruptive file migrations.

Hypervisor 224-4 may provide hardware virtualization techniques that allow multiple operating systems (e.g., "guest operating systems") to execute concurrently on a host computer, such as computing resource 224. Hypervisor 224-4 may present a virtual operating platform to the guest operating systems, and may manage the execution of the guest operating systems. Multiple instances of a variety of operating systems may share virtualized hardware resources.

Network 230 includes one or more wired and/or wireless networks. For example, network 230 may include a cellular network (e.g., a fifth generation (5G) network, a long-term evolution (LTE) network, a third generation (3G) network, a code division multiple access (CDMA) network, etc.), a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, and/or the like, and/or a combination of these or other types of networks.

The number and arrangement of devices and networks shown in FIG. 2 are provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of environment 200 may perform one or more functions described as being performed by another set of devices of environment 200.

FIG. 3 is a diagram of example components of a device 300. Device 300 may correspond to client device 210, electronic document platform 220, and/or computing resource 224. In some implementations, client device 210, electronic document platform 220, and/or computing resource 224 may include one or more devices 300 and/or one or more components of device 300. As shown in FIG. 3, device 300 may include a bus 310, a processor 320, a memory 330, a storage component 340, an input component 350, an output component 360, and a communication interface 370.

Bus 310 includes a component that permits communication among the components of device 300. Processor 320 is implemented in hardware, firmware, or a combination of hardware and software. Processor 320 is a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), or another type of processing component. In some implementations, processor 320 includes one or more processors capable of being programmed to perform a function. Memory 330 includes a random access memory (RAM), a read only memory (ROM), and/or another type of dynamic or static storage device (e.g., a flash memory, a magnetic memory, and/or an optical memory) that stores information and/or instructions for use by processor 320.

Storage component 340 stores information and/or software related to the operation and use of device 300. For example, storage component 340 may include a hard disk (e.g., a magnetic disk, an optical disk, a magneto-optic disk, and/or a solid state disk), a compact disc (CD), a digital versatile disc (DVD), a floppy disk, a cartridge, a magnetic tape, and/or another type of non-transitory computer-readable medium, along with a corresponding drive.

Input component 350 includes a component that permits device 300 to receive information, such as via user input (e.g., a touch screen display, a keyboard, a keypad, a mouse, a button, a switch, and/or a microphone). Additionally, or alternatively, input component 350 may include a sensor for sensing information (e.g., a global positioning system (GPS) component, an accelerometer, a gyroscope, and/or an actuator). Output component 360 includes a component that provides output information from device 300 (e.g., a display, a speaker, and/or one or more light-emitting diodes (LEDs)).

Communication interface 370 includes a transceiver-like component (e.g., a transceiver and/or a separate receiver and transmitter) that enables device 300 to communicate with other devices, such as via a wired connection, a wireless connection, or a combination of wired and wireless connections. Communication interface 370 may permit device 300 to receive information from another device and/or provide information to another device. For example, communication interface 370 may include an Ethernet interface, an optical interface, a coaxial interface, an infrared interface, a radio frequency (RF) interface, a universal serial bus (USB) interface, a Wi-Fi interface, a cellular network interface, and/or the like.

Device 300 may perform one or more processes described herein. Device 300 may perform these processes based on processor 320 executing software instructions stored by a non-transitory computer-readable medium, such as memory 330 and/or storage component 340. A computer-readable medium is defined herein as a non-transitory memory device. A memory device includes memory space within a single physical storage device or memory space spread across multiple physical storage devices.

Software instructions may be read into memory 330 and/or storage component 340 from another computer-readable medium or from another device via communication interface 370. When executed, software instructions stored in memory 330 and/or storage component 340 may cause processor 320 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number and arrangement of components shown in FIG. 3 are provided as an example. In practice, device 300 may include additional components, fewer components, different components, or differently arranged components than those shown in FIG. 3. Additionally, or alternatively, a set of components (e.g., one or more components) of device 300 may perform one or more functions described as being performed by another set of components of device 300.

FIG. 4 is a flow chart of an example process 400 for providing automation and digitalization of document processing systems. In some implementations, one or more process blocks of FIG. 4 may be performed by an electronic document platform (e.g., electronic document platform 220). In some implementations, one or more process blocks of FIG. 4 may be performed by another device or a group of devices separate from or including the electronic document platform, such as a client device (e.g., client device 210).

As shown in FIG. 4, process 400 may include receiving documents from various sources (block 410). For example, the electronic document platform (e.g., using computing resource 224, processor 320, communication interface 370, and/or the like) may receive documents from various sources, as described above in connection with FIGS. 1A-2.

As further shown in FIG. 4, process 400 may include processing the documents, with an optical character recognition engine, to generate digitized documents (block 420). For example, the electronic document platform (e.g., using computing resource 224, processor 320, memory 330, and/or the like) may process the documents, with an optical character recognition engine, to generate digitized documents, as described above in connection with FIGS. 1A-2.

As further shown in FIG. 4, process 400 may include processing the digitized documents, with a first machine learning model, to detect languages utilized in the digitized documents (block 430). For example, the electronic document platform (e.g., using computing resource 224, processor 320, storage component 340, and/or the like) may process the digitized documents, with a first machine learning model, to detect languages utilized in the digitized documents, as described above in connection with FIGS. 1A-2.

As further shown in FIG. 4, process 400 may include processing the digitized documents, in other languages that are different than a common language and with a second machine learning model, to translate the digitized documents, in the other languages, into the common language and to generate translated digitized documents (block 440). For example, the electronic document platform (e.g., using computing resource 224, processor 320, memory 330, storage component 340, and/or the like) may process the digitized documents, in other languages that are different than a common language and with a second machine learning model, to translate the digitized documents, in the other languages, into the common language and to generate translated digitized documents, as described above in connection with FIGS. 1A-2.

As further shown in FIG. 4, process 400 may include processing the translated digitized documents and untranslated digitized documents, with a classification model, to generate classified documents (block 450). For example, the electronic document platform (e.g., using computing resource 224, processor 320, memory 330, and/or the like) may process the translated digitized documents and untranslated digitized documents, with a classification model, to generate classified documents, as described above in connection with FIGS. 1A-2.

As further shown in FIG. 4, process 400 may include processing the classified documents, with a third machine learning model, to generate extracted information from the classified documents (block 460). For example, the electronic document platform (e.g., using computing resource 224, processor 320, storage component 340, and/or the like) may process the classified documents, with a third machine learning model, to generate extracted information from the classified documents, as described above in connection with FIGS. 1A-2.

As further shown in FIG. 4, process 400 may include validating the extracted information based on business rules and to generate validated extracted information (block 470). For example, the electronic document platform (e.g., using computing resource 224, processor 320, memory 330, and/or the like) may validate the extracted information based on business rules and to generate validated extracted information, as described above in connection with FIGS. 1A-2.

As further shown in FIG. 4, process 400 may include generating a smart contract for a transaction based on the validated extracted information, wherein the smart contract is to be used to facilitate processing of documents associated with performance of the transaction (block 480). For example, the electronic document platform (e.g., using computing resource 224, processor 320, storage component 340, and/or the like) may generate a smart contract for a transaction based on the validated extracted information, wherein the smart contract is to be used to facilitate processing of documents associated with performance of the transaction, as described above in connection with FIGS. 1A-2.

Process 400 may include additional implementations, such as any single implementation or any combination of implementations described below and/or described with regard to any other process described herein.

In some implementations, wherein the smart contract may be associated with a client device of a buyer in the transaction and the electronic document platform may provide the smart contract to a client device of a vendor that is to provide a product or a service to the buyer, may receive an approval of the smart contract from the client device of the buyer, and may provide, to a client device of a financial institution, information, instructing the financial institution to provide a payment for the product or the service.

In some implementations, the classification model may include a classification model based on the business rules, a classification model based on layouts of the digitized documents, a classification model based on a fourth machine learning model, and/or the like. In some implementations, when generating the smart contract for the transaction, the electronic document platform may process the validated extracted information, with a fourth machine learning model, to identify information associated with a buyer, a vendor, and a financial institution for the transaction, and may generate the smart contract for the transaction based on the buyer, the vendor, and the financial institution, wherein the smart contract may include information associated with the buyer, the vendor, and the financial institution.

In some implementations, when generating the smart contract for the transaction, the electronic document platform may automatically perform tax calculations for the transaction based on the validated extracted information, and may automatically prepare a tax submission document for the transaction based on the validated extracted information. In some implementations, when generating the smart contract for the transaction, the electronic document platform may automatically perform a legal compliance check for the transaction based on the validated extracted information, and may automatically generate a digital signature for the smart contract based on the legal compliance check.

In some implementations, the electronic document platform may determine whether the transaction is a duplicate transaction before generating the smart contract, may predict a volume and a price for the transaction before generating the smart contract, and may determine whether the transaction is fraudulent before generating the smart contract.

Although FIG. 4 shows example blocks of process 400, in some implementations, process 400 may include additional blocks, fewer blocks, different blocks, or differently arranged blocks than those depicted in FIG. 4. Additionally, or alternatively, two or more of the blocks of process 400 may be performed in parallel.

FIG. 5 is a flow chart of an example process 500 for providing automation and digitalization of document processing systems. In some implementations, one or more process blocks of FIG. 5 may be performed by an electronic document platform (e.g., electronic document platform 220). In some implementations, one or more process blocks of FIG. 5 may be performed by another device or a group of devices separate from or including the electronic document platform, such as a client device (e.g., client device 210).

As shown in FIG. 5, process 500 may include processing digitized documents, with a classification model, to generate classified documents (block 510). For example, the electronic document platform (e.g., using computing resource 224, memory 330, and/or the like) may process digitized documents, with a classification model, to generate classified documents, as described above in connection with FIGS. 1A-2.

As further shown in FIG. 5, process 500 may include processing the classified documents, with a machine learning model, to generate extracted information from the classified documents (block 520). For example, the electronic document platform (e.g., using computing resource 224, processor 320, storage component 340, and/or the like) may process the classified documents, with a machine learning model, to generate extracted information from the classified documents, as described above in connection with FIGS. 1A-2.

As further shown in FIG. 5, process 500 may include validating the extracted information based on business rules and to generate validated extracted information (block 530). For example, the electronic document platform (e.g., using computing resource 224, processor 320, memory 330, and/or the like) may validate the extracted information based on business rules and to generate validated extracted information, as described above in connection with FIGS. 1A-2.

As further shown in FIG. 5, process 500 may include identifying information associated with a transaction for a product or a service based on the validated extracted information (block 540). For example, the electronic document platform (e.g., using computing resource 224, processor 320, memory 330, storage component 340, and/or the like) may identify information associated with a transaction for a product or a service based on the validated extracted information, as described above in connection with FIGS. 1A-2.

As further shown in FIG. 5, process 500 may include determining a buyer of the product or the service, a vendor of the product or the service, and a financial institution for the transaction based on the validated extracted information (block 550). For example, the electronic document platform (e.g., using computing resource 224, processor 320, memory 330, and/or the like) may determine a buyer of the product or the service, a vendor of the product or the service, and a financial institution for the transaction based on the validated extracted information, as described above in connection with FIGS. 1A-2.

As further shown in FIG. 5, process 500 may include generating a smart contract for the transaction and associated with the buyer, the vendor, and the financial institution, wherein the smart contract is to be used to facilitate processing of documents associated with performance of the transaction (block 560). For example, the electronic document platform (e.g., using computing resource 224, processor 320, storage component 340, and/or the like) may generate a smart contract for the transaction and associated with the buyer, the vendor, and the financial institution, wherein the smart contract is to be used to facilitate processing of documents associated with performance of the transaction, as described above in connection with FIGS. 1A-2.

As further shown in FIG. 5, process 500 may include providing secure communication of the smart contract between the device, a client device of the buyer, a client device of the vendor, and a client device of the financial institution (block 570). For example, the electronic document platform (e.g., using computing resource 224, processor 320, memory 330, communication interface 370, and/or the like) may provide secure communication of the smart contract between the device, a client device of the buyer, a client device of the vendor, and a client device of the financial institution, as described above in connection with FIGS. 1A-2.

Process 500 may include additional implementations, such as any single implementation or any combination of implementations described below and/or described with regard to any other process described herein.

In some implementations, the electronic document platform may provide the smart contract to the client device of the vendor, may receive an approval of the smart contract from the client device of the buyer, and may provide, to the client device of the financial institution, information instructing the financial institution to provide a payment for the product or the service.

In some implementations, the machine learning model may include a support vector machine model, a linear regression model, a logistic regression model, a naive Bayes model, a linear discriminant analysis model, a decision tree model, a k-nearest neighbor model, a neural network model, and/or the like. In some implementations, when determining the buyer of the product or the service, the vendor of the product or the service, and the financial institution for the transaction, the electronic document platform may process the validated extracted information, with another machine learning model, to recommend a plurality of buyers, a plurality of vendors, or a plurality of financial institutions for the transaction, and may automatically select the buyer from the plurality of buyers, the vendor from the plurality of vendors, or the financial institution from the plurality of financial institutions.

In some implementations, the electronic document platform may automatically perform tax calculations for the transaction based on the validated extracted information, and may automatically prepare a tax submission document for the transaction based on the validated extracted information. In some implementations, the electronic document platform may automatically perform a legal compliance check for the transaction based on the validated extracted information, and may automatically generate a digital signature for the smart contract when the legal compliance check indicates that the transaction is legally compliant.

In some implementations, the electronic document platform may determine whether the transaction is a duplicate transaction before generating the smart contract, may predict a volume and a price for the transaction before generating the smart contract, and/or may determine whether the transaction is fraudulent before generating the smart contract.

Although FIG. 5 shows example blocks of process 500, in some implementations, process 500 may include additional blocks, fewer blocks, different blocks, or differently arranged blocks than those depicted in FIG. 5. Additionally, or alternatively, two or more of the blocks of process 500 may be performed in parallel.

FIG. 6 is a flow chart of an example process 600 for providing automation and digitalization of document processing systems. In some implementations, one or more process blocks of FIG. 6 may be performed by an electronic document platform (e.g., electronic document platform 220). In some implementations, one or more process blocks of FIG. 6 may be performed by another device or a group of devices separate from or including the electronic document platform, such as a client device (e.g., client device 210).

As shown in FIG. 6, process 600 may include processing digitized documents, with a first machine learning model, to detect languages utilized in the digitized documents (block 610). For example, the electronic document platform (e.g., using computing resource 224, processor 320, storage component 340, and/or the like) may process digitized documents, with a first machine learning model, to detect languages utilized in the digitized documents, as described above in connection with FIGS. 1A-2.

As further shown in FIG. 6, process 600 may include processing the digitized documents, in other languages that are different than a common language and with a second machine learning model, to translate the digitized documents, in the other languages, into the common language and to generate translated digitized documents (block 620). For example, the electronic document platform (e.g., using computing resource 224, processor 320, memory 330, and/or the like) may process the digitized documents, in other languages that are different than a common language and with a second machine learning model, to translate the digitized documents, in the other languages, into the common language and to generate translated digitized documents, as described above in connection with FIGS. 1A-2.

As further shown in FIG. 6, process 600 may include processing the translated digitized documents and untranslated digitized documents, with a classification model, to generate classified documents (block 630). For example, the electronic document platform (e.g., using computing resource 224, processor 320, storage component 340, and/or the like) may process the translated digitized documents and untranslated digitized documents, with a classification model, to generate classified documents, as described above in connection with FIGS. 1A-2.

As further shown in FIG. 6, process 600 may include processing the classified documents, with a third machine learning model, to generate extracted information from the classified documents (block 640). For example, the electronic document platform (e.g., using computing resource 224, processor 320, memory 330, and/or the like) may process the classified documents, with a third machine learning model, to generate extracted information from the classified documents, as described above in connection with FIGS. 1A-2.

As further shown in FIG. 6, process 600 may include validating the extracted information based on business rules and to generate validated extracted information (block 650). For example, the electronic document platform (e.g., using computing resource 224, processor 320, memory 330, storage component 340, and/or the like) may validate the extracted information based on business rules and to generate validated extracted information, as described above in connection with FIGS. 1A-2.

As further shown in FIG. 6, process 600 may include identifying information associated with a transaction for a product or a service based on the validated extracted information (block 660). For example, the electronic document platform (e.g., using computing resource 224, processor 320, memory 330, storage component 340, and/or the like) may identify information associated with a transaction for a product or a service based on the validated extracted information, as described above in connection with FIGS. 1A-2.

As further shown in FIG. 6, process 600 may include determining a buyer of the product or the service, a vendor of the product or the service, and a financial institution for the transaction based on the validated extracted information (block 670). For example, the electronic document platform (e.g., using computing resource 224, processor 320, storage component 340, and/or the like) may determine a buyer of the product or the service, a vendor of the product or the service, and a financial institution for the transaction based on the validated extracted information, as described above in connection with FIGS. 1A-2.

As further shown in FIG. 6, process 600 may include generating a smart contract for the transaction and associated with the buyer, the vendor, and the financial institution (block 680). For example, the electronic document platform (e.g., using computing resource 224, processor 320, memory 330, and/or the like) may generate a smart contract for the transaction and associated with the buyer, the vendor, and the financial institution, as described above in connection with FIGS. 1A-2.

Process 600 may include additional implementations, such as any single implementation or any combination of implementations described below and/or described with regard to any other process described herein.

In some implementations, the electronic document platform may provide the smart contract to a client device of the vendor, may receive an approval of the smart contract from a client device of the buyer, and may provide, to a client device of the financial institution, information instructing the financial institution to provide a payment for the product or the service. In some implementations, the classification model may include a classification model based on the business rules, a classification model based on layouts of the digitized documents, a classification model based on a fourth machine learning model, and/or the like.

In some implementations, the electronic document platform may provide secure communication of the smart contract between the device, a client device of the buyer, a client device of the vendor, and a client device of the financial institution. In some implementations, when determining the buyer of the product or the service, the vendor of the product or the service, and the financial institution for the transaction, the electronic document platform may process the validated extracted information, with a fourth machine learning model, to recommend a plurality of buyers, a plurality of vendors, or a plurality of financial institutions for the transaction, and may automatically select the buyer from the plurality of buyers, the vendor from the plurality of vendors, or the financial institution from the plurality of financial institutions.

In some implementations, the electronic document platform may perform a legal compliance check for the transaction based on the validated extracted information, and may generate a digital signature for the smart contract when the legal compliance check indicates that the transaction is legally compliant.

Although FIG. 6 shows example blocks of process 600, in some implementations, process 600 may include additional blocks, fewer blocks, different blocks, or differently arranged blocks than those depicted in FIG. 6. Additionally, or alternatively, two or more of the blocks of process 600 may be performed in parallel.

Some implementations described herein provide an electronic document platform that provides automation and digitalization of document processing systems. For example, the electronic document platform may receive documents from various sources, and may process the documents, with an optical character recognition engine, to generate digitized documents. The electronic document platform may process the digitized documents, with a first machine learning model, to detect languages utilized in the digitized documents, and may process the digitized documents, in other languages that are different than a common language and with a second machine learning model, to translate the digitized documents, in the other languages, into the common language and to generate translated digitized documents. The electronic document platform may process the translated digitized documents and untranslated digitized documents, with a classification model, to generate classified documents, and may process the classified documents, with a third machine learning model, to generate extracted information from the classified documents. The electronic document platform may validate the extracted information based on business rules and to generate validated extracted information, and may generate a smart contract for a transaction based on the validated extracted information.

The foregoing disclosure provides illustration and description, but is not intended to be exhaustive or to limit the implementations to the precise form disclosed. Modifications and variations are possible in light of the above disclosure or may be acquired from practice of the implementations.

As used herein, the term component is intended to be broadly construed as hardware, firmware, or a combination of hardware and software.

Certain user interfaces have been described herein and/or shown in the figures. A user interface may include a graphical user interface, a non-graphical user interface, a text-based user interface, or the like. A user interface may provide information for display. In some implementations, a user may interact with the information, such as by providing input via an input component of a device that provides the user interface for display. In some implementations, a user interface may be configurable by a device and/or a user (e.g., a user may change the size of the user interface, information provided via the user interface, a position of information provided via the user interface, etc.). Additionally, or alternatively, a user interface may be pre-configured to a standard configuration, a specific configuration based on a type of device on which the user interface is displayed, and/or a set of configurations based on capabilities and/or specifications associated with a device on which the user interface is displayed.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware may be designed to implement the systems and/or methods based on the description herein.

Even though particular combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Furthermore, as used herein, the term "set" is intended to include one or more items (e.g., related items, unrelated items, a combination of related and unrelated items, etc.), and may be used interchangeably with "one or more." Where only one item is intended, the term "one" or similar language is used. Also, as used herein, the terms "has," "have," "having," or the like are intended to be open-ended terms. Further, the phrase "based on" is intended to mean "based, at least in part, on" unless explicitly stated otherwise.

What is claimed is:
1. A device, comprising:
one or more memories; and
one or more processors, communicatively coupled to the one or more memories, to:
receive documents from various sources;
pre-process the documents using at least one of:
a data cleansing technique, or
a data reduction technique;
generate digitized documents by processing the pre-processed documents with an optical character recognition engine;
process the digitized documents, with a first machine learning model, to detect languages utilized in the digitized documents;
process the digitized documents, in other languages that are different than a common language and with a second machine learning model, to translate the digitized documents, in the other languages, into the common language and to generate translated digitized documents;
process the translated digitized documents and untranslated digitized documents, with a classification model, to generate classified documents;
process the classified documents, with a third machine learning model, to generate extracted information from the classified documents;
validate the extracted information based on business rules and to generate validated extracted information;
process the validated extracted information, with a fourth machine learning model, to identify information associated with a buyer, a vendor, and a financial institution for a transaction;
determine whether the transaction is a duplicate transaction or is fraudulent; and
generate a smart contract for the transaction based on the buyer, the vendor, and the financial institution based on the transaction not being a duplicate transaction or fraudulent,
wherein the smart contract includes information associated with the buyer, the vendor, and the financial institution,
wherein the smart contract is to be used to facilitate processing of documents associated with performance of the transaction, and
wherein the smart contract is associated with a client device of the buyer in the transaction and the one or more processors are further to:
provide the smart contract to a client device of the vendor that is to provide a product or a service to the buyer,
receive an approval of the smart contract from the client device of the buyer, and
provide, to a client device of the financial institution, information instructing the financial institution to provide a payment for the product or the service.

2. The device of claim 1, wherein the classification model includes one or more of:
a classification model based on the business rules,
a classification model based on layouts of the digitized documents, or
a classification model based on a fifth machine learning model.

3. The device of claim 1, wherein the one or more processors, when generating the smart contract for the transaction, are to:
automatically perform tax calculations for the transaction based on the validated extracted information; and
automatically prepare a tax submission document for the transaction based on the validated extracted information.

4. The device of claim 1, wherein the one or more processors, when generating the smart contract for the transaction, are to:
automatically perform a legal compliance check for the transaction based on the validated extracted information; and
automatically generate a digital signature for the smart contract based on the legal compliance check.

5. The device of claim 1, wherein the one or more processors are further to:
predict a volume and a price for the transaction before generating the smart contract.

6. A non-transitory computer-readable medium storing instructions, the instructions comprising:
one or more instructions that, when executed by one or more processors of a device, cause the one or more processors to:
pre-process documents using at least one of:
a data cleansing technique, or
a data reduction technique;
generate digitized documents by processing the pre-processed documents;
process the digitized documents, with a classification model, to generate classified documents;
process the classified documents, with a machine learning model, to generate extracted information from the classified documents;
validate the extracted information based on business rules and to generate validated extracted information;
identify information associated with a transaction for a product or a service based on the validated extracted information;
process the validated extracted information, with another machine learning model, to recommend a buyer of the product or service, a vendor of the product or service, and a financial institution for the transaction;
determine whether the transaction is a duplicate transaction or is fraudulent; and
generate a smart contract for the transaction and associated with the buyer, the vendor, and the financial institution based on the transaction not being a duplicate transaction or fraudulent,
wherein the smart contract includes information associated with the buyer, the vendor, and the financial institution,
wherein the smart contract is to be used to facilitate processing of documents associated with performance of the transaction, and
wherein the smart contract is associated with a client device of the buyer in the transaction and wherein the one or more instructions, when executed by the one or more processors, further cause the one or more processors to:
provide the smart contract to a client device of the vendor that is to provide the product or the service to the buyer,
receive an approval of the smart contract from the client device of the buyer, and
provide, to a client device of the financial institution, information instructing the financial institution to provide a payment for the product or the service.

7. The non-transitory computer-readable medium of claim 6, wherein the machine learning model includes one or more of:
a support vector machine model,
a linear regression model,
a logistic regression model,
a naive Bayes model,
a linear discriminant analysis model,
a decision tree model,
a k-nearest neighbor model, or
a neural network model.

8. The non-transitory computer-readable medium of claim 6, wherein the one or more instructions, that cause the one or more processors to process the validated extracted information, cause the one or more processors to:

automatically select the buyer from a plurality of buyers, the vendor from a plurality of vendors, or the financial institution from a plurality of financial institutions.

9. The non-transitory computer-readable medium of claim 6, wherein the instructions further comprise:
one or more instructions that, when executed by the one or more processors, cause the one or more processors to:
automatically perform tax calculations for the transaction based on the validated extracted information; and
automatically prepare a tax submission document for the transaction based on the validated extracted information.

10. The non-transitory computer-readable medium of claim 6, wherein the instructions further comprise:
one or more instructions that, when executed by the one or more processors, cause the one or more processors to:
automatically perform a legal compliance check for the transaction based on the validated extracted information; and
automatically generate a digital signature for the smart contract when the legal compliance check indicates that the transaction is legally compliant.

11. The non-transitory computer-readable medium of claim 6, wherein the instructions further comprise:
one or more instructions that, when executed by the one or more processors, cause the one or more processors to one or more of:
predict a volume and a price for the transaction before generating the smart contract.

12. A method, comprising:
pre-processing, by a device, documents using at least one of:
a data cleansing technique, or
a data reduction technique;
generating, by the device, digitized documents by processing the pre-processed documents;
processing, by the device, the digitized documents, with a first machine learning model, to detect languages utilized in the digitized documents;
processing, by the device, the digitized documents, in other languages that are different than a common language and with a second machine learning model, to translate the digitized documents, in the other languages, into the common language and to generate translated digitized documents;
processing, by the device, the translated digitized documents and untranslated digitized documents, with a classification model, to generate classified documents;
processing, by the device, the classified documents, with a third machine learning model, to generate extracted information from the classified documents;
validating, by the device, the extracted information based on business rules and to generate validated extracted information;
identifying, by the device, information associated with a transaction for a product or a service based on the validated extracted information;
determining, by the device and via a fourth machine learning model, a buyer of the product or the service, a vendor of the product or the service, and a financial institution for the transaction based on the validated extracted information; and
determining, by the device, whether the transaction is a duplicate transaction or is fraudulent; and generating, by the device, a smart contract for the transaction and associated with the buyer, the vendor, and the financial institution based on the transaction not being a duplicate transaction or fraudulent,
wherein the smart contract includes information associated with the buyer, the vendor, and the financial institution,
wherein the smart contract is to be used to facilitate processing of documents associated with performance of the transaction, and
wherein the smart contract is associated with a client device of the buyer in the transaction and the method further comprises:
providing the smart contract to a client device of the vendor that is to provide a product or a service to the buyer,
receiving an approval of the smart contract from the client device of the buyer, and
providing, to a client device of the financial institution, information instructing the financial institution to provide a payment for the product or the service.

13. The method of claim 12, wherein the classification model includes one or more of:
a classification model based on the business rules,
a classification model based on layouts of the digitized documents, or
a classification model based on a fifth machine learning model.

14. The method of claim 12, further comprising:
providing secure communication of the smart contract between the device, a client device of the buyer, a client device of the vendor, and a client device of the financial institution.

15. The method of claim 12, wherein determining the buyer of the product or the service, the vendor of the product or the service, and the financial institution for the transaction, includes:
processing the validated extracted information, with the fourth machine learning model, to recommend a plurality of buyers, a plurality of vendors, or a plurality of financial institutions for the transaction; and
automatically selecting the buyer from the plurality of buyers, the vendor from the plurality of vendors, or the financial institution from the plurality of financial institutions.

16. The method of claim 12, further comprising:
performing a legal compliance check for the transaction based on the validated extracted information; and
generating a digital signature for the smart contract when the legal compliance check indicates that the transaction is legally compliant.

17. The method of claim 12, further comprising:
predicting a volume and a price for the transaction before generating the smart contract.

18. The device of claim 5, wherein the volume and the price for the transaction is predicted based on at least one of:
an inventory of the buyer for the product,
current market prices for the product, or
a turnaround time for the product.

19. The non-transitory computer-readable medium of claim 11, wherein the volume and the price for the transaction is predicted based on at least one of:
an inventory of the buyer for the product,
current market prices for the product, or
a turnaround time for the product.

20. The method of claim 17, wherein the volume and the price for the transaction is predicted based on at least one of:
  an inventory of the buyer for the product,
  current market prices for the product, or
  a turnaround time for the product.

\* \* \* \* \*